(12) United States Patent
Yokoyama

(10) Patent No.: US 8,929,337 B2
(45) Date of Patent: Jan. 6, 2015

(54) WIRELESS BASE STATION, WIRELESS COMMUNICATION SYSTEM, AND WIRELESS COMMUNICATION METHOD

(75) Inventor: Hitoshi Yokoyama, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 13/561,279

(22) Filed: Jul. 30, 2012

(65) Prior Publication Data

US 2013/0051361 A1 Feb. 28, 2013

(30) Foreign Application Priority Data

Aug. 25, 2011 (JP) ................. 2011-184096

(51) Int. Cl.
*H04W 4/00* (2009.01)
*H04W 76/00* (2009.01)

(52) U.S. Cl.
CPC .................. *H04W 76/002* (2013.01)
USPC .......................... 370/331; 370/329

(58) Field of Classification Search
CPC ................................... H04W 76/00
USPC .......................... 370/331, 328, 329
See application file for complete search history.

(56) References Cited

U.S. PATENT DOCUMENTS

| 6,333,921 | B1* | 12/2001 | Grube et al. ................. | 370/312 |
| 2006/0007930 | A1* | 1/2006 | Dorenbosch ................. | 370/390 |
| 2009/0239515 | A1* | 9/2009 | Bai et al. ..................... | 455/416 |
| 2012/0034920 | A1* | 2/2012 | Inumaru ...................... | 455/437 |
| 2012/0327836 | A1* | 12/2012 | Narayanasamy ............ | 370/312 |

FOREIGN PATENT DOCUMENTS

JP 2007-82007 3/2007

* cited by examiner

*Primary Examiner* — Andrew Lai
*Assistant Examiner* — Sumitra Ganguly
(74) *Attorney, Agent, or Firm* — Katten Muchin Rosenman LLP

(57) ABSTRACT

A wireless base station includes a first receiving section which receives data from a plurality of terminals positioned within a wireless area in which data communication with a processing section on a network is performed by the wireless base station via a core network, a multiplexing controller which shares, with the processing section, first identification information allocated to a group and second identification information allocated to each of a plurality of member terminals constituting the group, and controls to determine whether a terminal serving as a source of the received data is a member terminal belonging to the group, based on the second identification information, and to multiplex, of the received data from the plurality of terminals, data from the terminal determined to be the member terminal belonging to the group, based on the first identification information, and a first sending section sends the multiplexed data to the core network.

16 Claims, 17 Drawing Sheets

WIRELESS BASE STATION, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2011-184096, filed on Aug. 25, 2011, the entire contents of which is incorporated herein by reference.

FIELD

Embodiments discussed herein are related to a wireless base station, a wireless communication system, and a wireless communication method.

BACKGROUND

In a wireless communication system, techniques for reducing the number of communication links established between a wireless base station and a core network have been known. The techniques include, for example, a technique in which data from a plurality of wireless terminals (hereinafter may also be referred to as "user equipment (UE)") is multiplexed by wirelessly connecting to the UEs via a mobile router.

Japanese Laid-open Patent Publication No. 2007-082007 discusses an example of a technique that performs communication by multiplexing data from a plurality of wireless terminals by using a mobile router.

SUMMARY

According to an aspect of the invention, a wireless base station includes a first receiving section which receives data from a plurality of terminals positioned within a wireless area in which data communication with a processing section on a network is performed by the wireless base station via a core network, a multiplexing controller which shares, with the processing section, first identification information allocated to a group and second identification information allocated to each of a plurality of member terminals constituting the group, and controls a terminal determining section to determine whether a terminal serving as a source of the received data is a member terminal belonging to the group, based on the second identification information, and a data multiplexing section to multiplex, of the received data from the plurality of terminals, data from the terminal determined to be the member terminal belonging to the group, based on the first identification information, and a first sending section sends the multiplexed data to the core network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described. In the following embodiments, the case in which a plurality of UEs within a wireless area of a wireless base station perform data communication with a data center will be described by way of example. However, the embodiments are not restricted to this example, and the same applies to the case in which each of the UEs performs data communication with an arbitrary processing section such as a server on a network.

While inventing the present embodiments, observations were made regarding a related art. Such observations include the following, for example.

Figure 1:
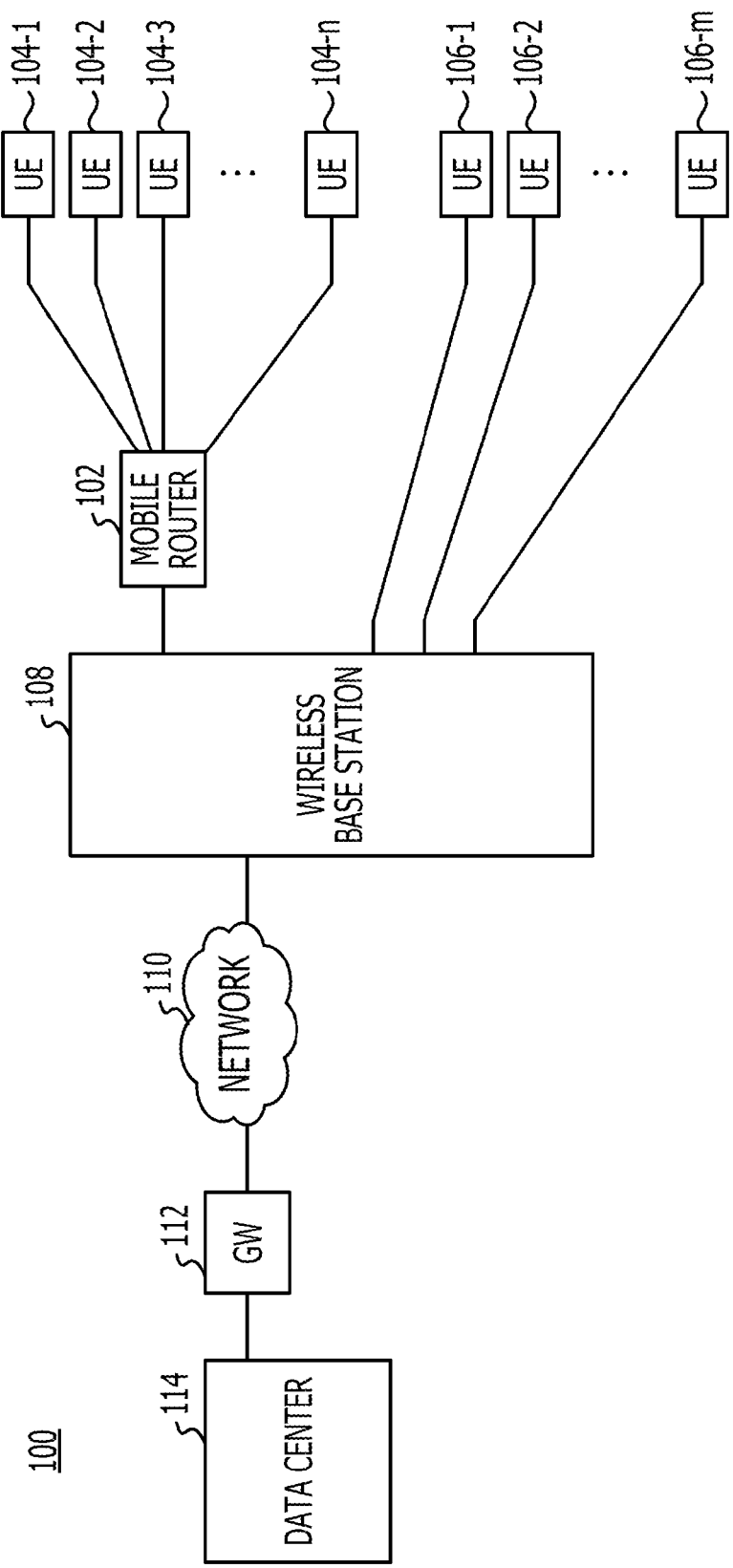
FIG. 1 is a diagram illustrating an example of a wireless communication system using a mobile router.

As an example of a wireless communication system of a related art, FIG. 1 is a diagram illustrating an example of a wireless communication system using a mobile router. As illustrated in FIG. 1, a wireless communication system 100 includes a mobile router 102, UEs 104-1 to 104-$n$ under the mobile router 102, other UEs 106-1 to 106-$m$ under a wireless base station 108, the wireless base station 108, a network 110, a gateway (GW) 112, and a data center (DC) 114 (n and m are integers that correspond to the number of corresponding UEs).

The mobile router 102 establishes wireless connections with the plural UEs 104-1 to 104-$n$ thereunder. The mobile router 102 further establishes, as a representative of the UEs 104-1 to 104-$n$ thereunder, a connection with the wireless base station 108, and establishes a communication link with the gateway 112 via the network 110. Accordingly, the mobile router 102 multiplexes pieces of data from the plural UEs 104-1 to 104-$n$ thereunder.

By causing a gateway and a wireless base station to perceive that a mobile router is a single representative UE section as above, for example, eight UEs under the mobile router may communicate with a core network by using a single communication link, without establishing eight communication links with the core network. In this way, the number of signaling events for establishing a communication link may be reduced.

However, because the mobile router is equipment that corresponds to a wireless terminal and has limited transmission power, an area where a wireless connection may be established (wireless area) is also a limited narrow area. The mobile router may only be capable of multiplexing pieces of data from UEs that exist within the narrow wireless area near the location of the mobile router. That is, when the location of a UE section desired to be communicated via the mobile router is far from the mobile router and is outside the wireless area of the mobile router, that UE section may not be able to establish a wireless connection with the mobile router, and the mobile router may not be able to multiplex data from that UE section.

As a result, there is a problem that the mobile router may multiplex data from a limited number of UEs because of the limited wireless area.

1. First Embodiment

Hereinafter, a wireless base station and a wireless communication system according to a first embodiment will be described.

1-1. Wireless Communication System

Figure 2:
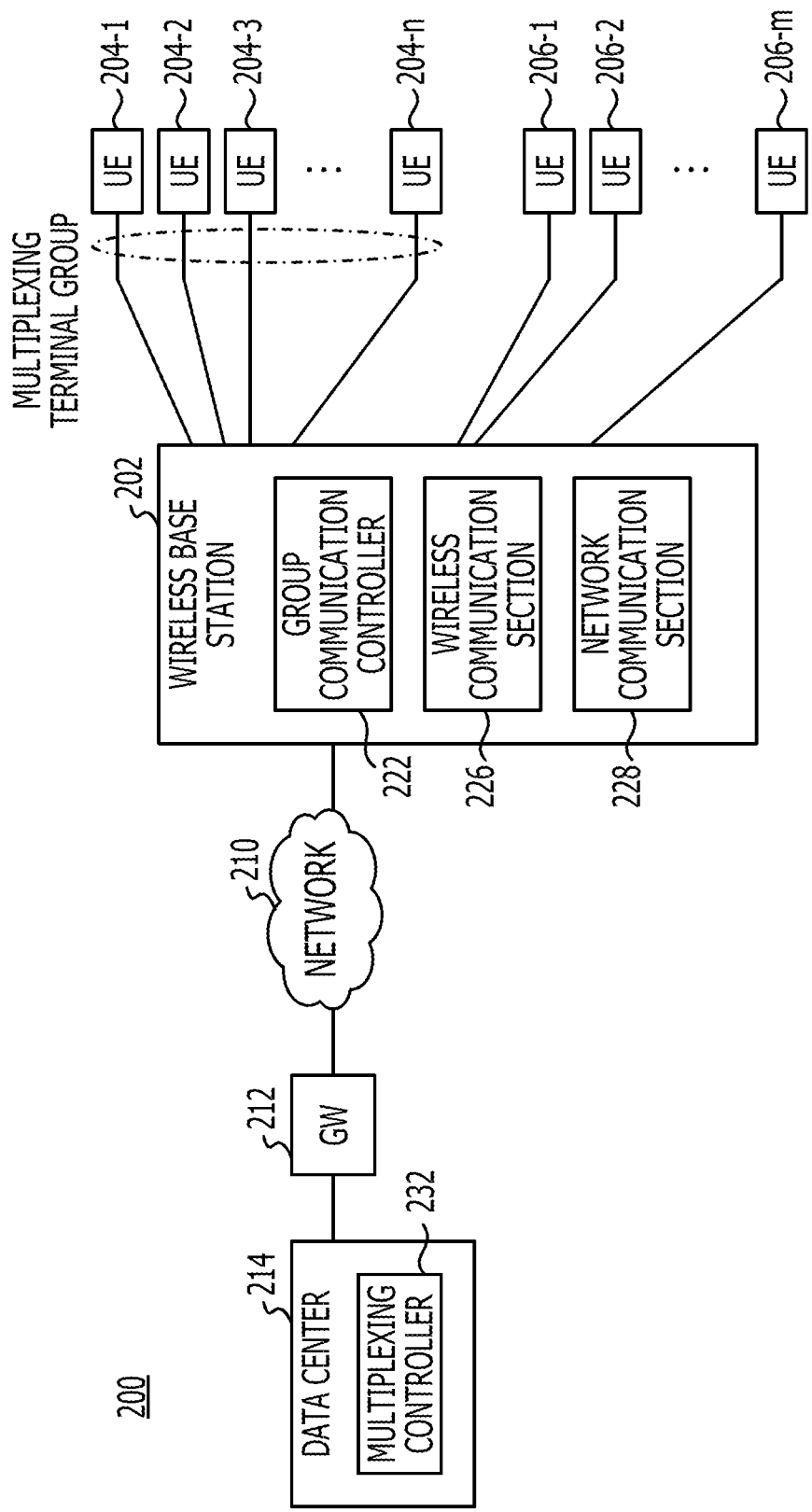
FIG. 2 is a diagram illustrating an example of the configuration of a wireless communication system according to a first embodiment.

The overall configuration of a wireless communication system 200 according to the first embodiment will be described. FIG. 2 is a diagram illustrating an example of the configuration of the wireless communication system 200 according to the first embodiment.

As illustrated in FIG. 2, the wireless communication system 200 includes a wireless base station 202, UEs 204 (204-1 to 204-$n$) and UEs 206 (206-1 to 206-$m$) existing in a wireless area of the wireless base station 202, a network 210, a gateway 212, and a data center 214 (n and m are integers that correspond to the number of corresponding UEs). The wireless base station 202 includes a group communication controller 222, a wireless communication section 226, and a network communication section 228. The data center 214 includes a multiplexing controller 232.

Among the UEs within the wireless communication area of the wireless base station 202, the UEs 204-1 to 204-$n$ are terminals (member UEs) that belong to a group constituted of terminals that are subjected to data multiplexing in communication with a core network (multiplexing terminal group). In contrast, the UEs 206-1 to 206-$m$ are terminals that do not belong to the multiplexing terminal group, and the UEs 206-1 to 206-$m$ are terminals that individually perform normal communication with the core network (general UEs).

The gateway 212 is a gateway section such as a packet data network gateway (PDN GW) or a serving gateway (GW). The core network includes network equipment such as the gateway 212 and a mobility management entity (MME), which will be described later.

The wireless base station 202 establishes, via the network 210, a communication link between the UEs 204 and 206 thereunder and the core network, and performs data communication with the data center 214 via the established communication link. Here, data communication corresponds to packet communication, and data corresponds to packet data. The same applies to the following description.

In the wireless base station 202, the group communication controller 222 controls establishment of a communication link between the UEs 204 and 206 thereunder and the core network. The wireless communication section 226 sends and receives data and signals such as control signals to and from the UEs 204 and 206 by performing wireless communication. The network communication section 228 sends and receives data and signals such as control signals to and from the data center 214 and the core network including the gateway 212 and MME via the network 210.

In the data center 214, the multiplexing controller 232 holds group constituent information of the multiplexing terminal group. The group constituent information includes a group ID (group identification information) and a plurality of member terminal IDs (member terminal identification information). A member terminal ID is identification information (terminal ID) of a terminal (UE section) that is a member of the multiplexing terminal group and that is subjected to data multiplexing, and is information allocated to each UE section belonging to the multiplexing terminal group. A group ID is identification information allocated to each multiplexing terminal group, and, at the same time, is identification information (terminal ID) of the representative UE section of each multiplexing terminal group. The representative UE section is a virtual UE section that represents a plurality of member UEs that belong to the multiplexing terminal group. The representative UE section is provided in correspondence with the multiplexing terminal group, and, for a processing section such as the core network and the data center 214, behaves as a UE section at a sending and receiving source of data communication, in place of each member UE section.

In the wireless base station 202, the group communication controller 222 holds the group constituent information of the multiplexing terminal group, which is the same as that held by the multiplexing controller 232 in the data center 214. That is, the group communication controller 222 in the wireless base station 202 and the multiplexing controller 232 in the data center 214 share the same group constituent information. On the basis of the held group constituent information, the group communication controller 222 controls a multiplexing process of multiplexing pieces of data sent from, among UEs within the wireless area of the wireless base station 202, the UEs 204-1 to 204-$n$ that belong to the multiplexing terminal group to data of the representative UE section.

Also, the group communication controller 222 controls a separation process of receiving, from the data center 214 via the network 210, data that has been multiplexed to data of the representative UE section based on the group ID (multiplexed data), and, based on the group constituent information, separating the received multiplexed data into pieces of data of the individual member UEs. The details of the data multiplexing process and separation process will be described later.

1-2. Wireless Base Station

Figure 3:
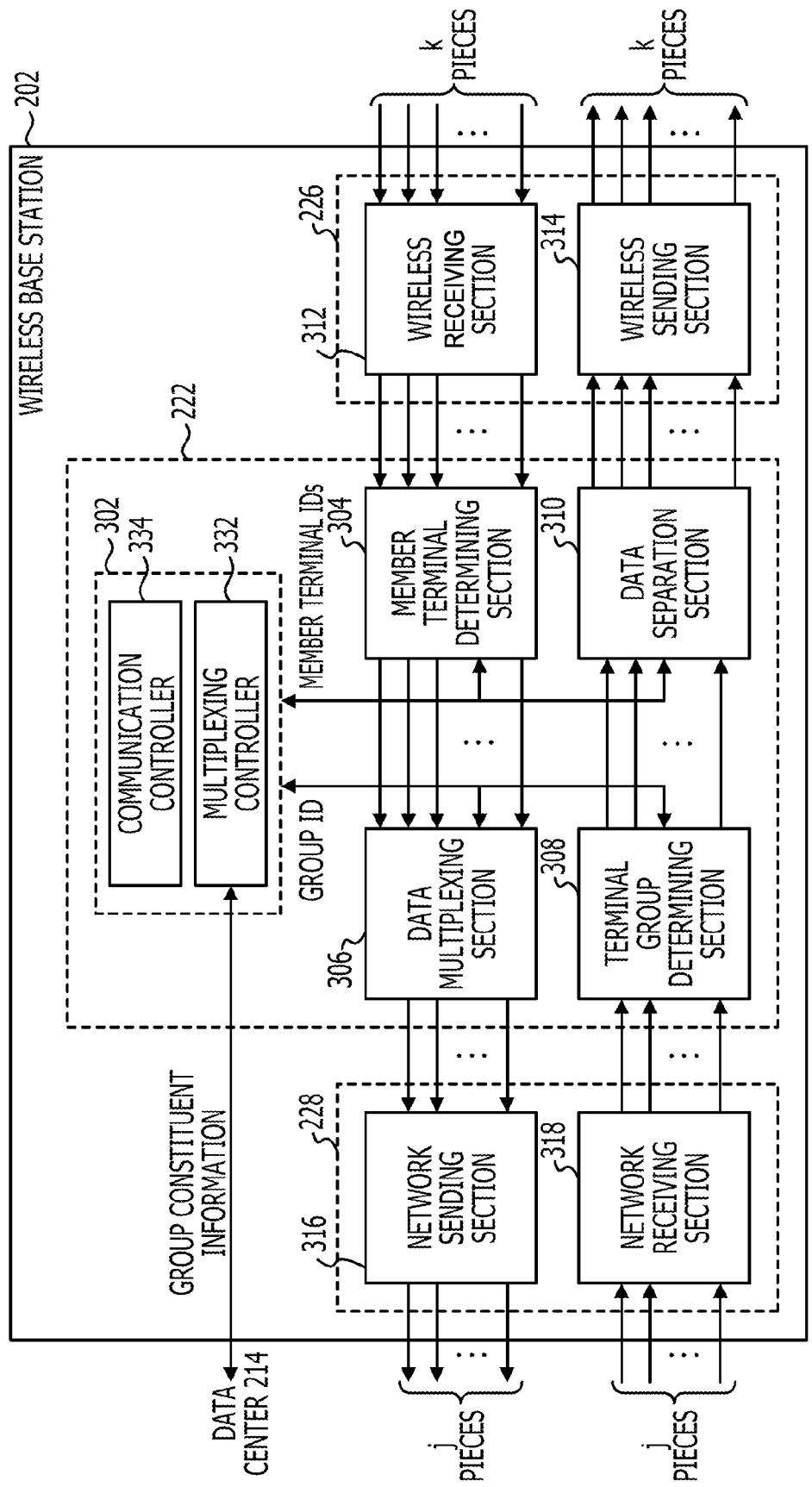
FIG. 3 is a diagram illustrating an example of the configuration of a wireless base station according to the first embodiment.

Next, the details of the configuration of the wireless base station 202 according to the first embodiment will be described. FIG. 3 is a diagram illustrating an example of the configuration of the wireless base station 202 according to the first embodiment.

As illustrated in FIG. 3, the wireless base station 202 includes a controller 302, a member terminal determining section 304, a data multiplexing section 306, a terminal group determining section 308, a data separation section 310, a wireless receiving section 312, a wireless sending section 314, a network sending section 316, and a network receiving section 318. Here, the controller 302, the member terminal determining section 304, the data multiplexing section 306, the terminal group determining section 308, and the data separation section 310 correspond to the group communication controller 222 illustrated in FIG. 2. The wireless receiving section 312 and the wireless sending section 314 correspond to the wireless communication section 226, and the network sending section 316 and the network receiving section 318 correspond to the network communication section 228.

The controller 302 includes a multiplexing controller 332 and a communication controller 334. In the controller 302, the multiplexing controller 332 holds the group constituent information, which is the same as that held by the multiplexing controller 232 in the data center 214 illustrated in FIG. 2. That is, the multiplexing controller 332 and the multiplexing controller 232 share the same group constituent information. As has been described above, the group constituent information includes the group ID (group identification information) and the member terminal IDs (member terminal identification information). The multiplexing controller 332 supplies the member terminal IDs to the member terminal determining section 304 and the data separation section 310. Also, the multiplexing controller 332 supplies the group ID to the data multiplexing section 306 and the terminal group determining section 308.

The wireless receiving section 312 receives data and various signals such as control signals from UEs within the wireless area of the wireless base station 202 by performing wireless communication. Each of the received signals includes, as information indicating the source of the signal, identification information (terminal ID) allocated to each UE section. The wireless receiving section 312 supplies the received signals to the member terminal determining section 304.

For each received signal supplied from the wireless receiving section 312, the member terminal determining section 304 compares a terminal ID included in the received signal with the member terminal IDs supplied from the multiplexing controller 332, and determines whether the received signal is a signal sent from a member UE section that belongs to the multiplexing terminal group. When the comparison result indicates that the terminal ID coincides with one of the member terminal IDs, the member terminal determining section 304 determines that the corresponding received signal is a signal sent from the member UE section. For each received signal, the member terminal determining section 304 notifies the multiplexing controller 332 of a determination result and a terminal ID included in the received signal. When the received signal is data, the member terminal determining section 304 supplies a determination result and the received data to the data multiplexing section 306.

The data multiplexing section 306 receives the determination result and the received data from the member terminal determining section 304, and, based on the received determination result, extracts the received data to be multiplexed. That is, when the determination result indicates that the received data is data sent from a member UE section, the data multiplexing section 306 extracts the corresponding received data as data to be multiplexed.

The data multiplexing section 306 performs a multiplexing process of multiplexing the received data, which has been extracted as data to be multiplexed, to data of the representative UE section of the multiplexing terminal group by using the group ID supplied from the multiplexing controller 332. The data multiplexing section 306 encapsulates the extracted received data by adding header information including the group ID to the extracted received data. The data multiplexing section 306 supplies the encapsulated received data to the network sending section 316.

When the received data is data sent from a general UE section, the data multiplexing section 306 supplies the received data supplied from the member terminal determining section 304 to the network sending section 316 without changing the received data.

In the controller 302, when data to be sent that is supplied from the data multiplexing section 306 to the network sending section 316 is encapsulated data from a member UE section, the communication controller 334 establishes a common communication link for the multiplexing terminal group (group communication link) between the representative UE section and the core network prior to sending the data. The group communication link is shared among a plurality of member UEs that belong to the corresponding multiplexing terminal group and is commonly used for sending and reception of data from the member UEs. The group communication link is constituted of a single communication link corresponding to a single representative UE section. Establishment of this group communication link is performed in response to a control signal such as a connection request signal sent from a member UE section at the source of data. The details of establishment of the group communication link will be described later.

When data to be sent is data from a general UE section, the communication controller 334 establishes a normal communication link between the corresponding general UE section and the core network prior to sending the data.

The network sending section 316 sends the received data supplied from the data multiplexing section 306 to the data center 214 via the established communication link. At this point, when the data to be sent is encapsulated data from a member UE section, the network sending section 316 sends the encapsulated data as data from the representative UE section via the group communication link. Therefore, even when there are, as the sources of the data, plural member UEs that belong to the multiplexing terminal group, a processing section such as the data center 214 or network equipment constituting the core network, such as the gateway 212 or MME, may be caused to perceive as if the source of the data is a single representative UE section, and the data may be sent using a single group communication link.

The network receiving section 318 receives data from the data center 214 via the established communication link, and supplies the received data to the terminal group determining section 308. At this point, when a group communication link has been established between the representative UE section of the multiplexing terminal group and the core network and when the destination of the data is one of the member UEs that belong to the multiplexing terminal group, the network receiving section 318 receives the encapsulated data as data addressed to the representative UE section via the group communication link. The encapsulated data includes the group ID in the header information, and includes the member terminal ID allocated to each member UE section in the main body thereof. Therefore, even when there exit plural member UEs that belong to the multiplexing terminal group as data destinations, a processing section such as the data center 214 or network equipment constituting the core network may be caused to perceive the data destination as a single representative UE section, and data may be received using a single group communication link.

For each piece of received data supplied from the network receiving section 318, the terminal group determining section 308 compares the group ID included in the header information of the received data with the group ID supplied from the multiplexing controller 332, and determines whether the received data is encapsulated data that has been sent to a member UE section belonging to the multiplexing terminal group. When the comparison result indicates that the two IDs coincide with each other, the terminal group determining section 308 determines that the corresponding received data is encapsulated data that has been sent to a member UE section. For each piece of received data, the terminal group determining section 308 supplies the determination result and the received data to the data separation section 310.

The data separation section 310 receives the determination result and the received data from the terminal group determining section 308, and, based on the received determination result, determines whether the received data is encapsulated data that has been sent to a member UE section. When the determination result indicates that the received data is encapsulated data that has been sent to a member UE section, the data separation section 310 determines that the corresponding received data is data that has been multiplexed to data of the representative UE section.

The data separation section 310 performs a separation process of separating the received data, which has been determined to be data multiplexed to data of the representative UE section, into data of each member UE section by using the member terminal ID included in the main body of the received data. The data separation section 310 decapsulates the received data by deleting, from the received data, the header information including the group ID. The data separation section 310 supplies the decapsulated received data to the wireless sending section 314.

When the received data is data sent to a general UE section, the data separation section 310 sends the received data supplied from the terminal group determining section 308 to the wireless sending section 314 without changing the received data.

The wireless sending section 314 sends the received data supplied from the data separation section 310 to a UE section serving as the destination within the wireless area of the wireless base station 202 by performing wireless communication.

As has been described above, with regard to the wireless base station 202, for example, as illustrated in FIG. 3, even when k pieces of data are input from k UEs under the wireless base station 202, with a multiplexing process performed by the group communication controller 222, a processing section such as the data center 214 or network equipment constituting the core network may be caused to perceive as if there exist j (j<k) data outputs. Therefore, with regard to the wireless base station 202, the number of communication links with the core network may be reduced by k−j, and the number of signaling events at the time of establishment of communication links may be reduced by k−j.

In this case, the degree of multiplexing at the group communication controller 222 is k−j+1, and a multiplexing process becomes a process of multiplexing pieces of data from (k−j+1) member UEs to data of a single representative UE section.

Therefore, with regard to the group communication controller 222 in the wireless base station 202, for a plurality of wireless terminals (UEs) thereunder, the number of UEs whose data may be multiplexed may be increased, and the number of communication links to be established with the core network may be decreased.

1-3. Sequence of Multiplexing Process

Next, the sequence of a multiplexing process performed in the wireless communication system 200 will be described.

Hereinafter, the case in which the Long Term Evolution (LTE) of the Third Generation Partnership Project (3GPP) is adopted as the communication specification will be described by way of example. However, the communication specification is not limited to LTE, and the following embodiments are applicable to other communication specifications.

1-3-1. When None of Member UEs are Performing Communication

Figure 4:
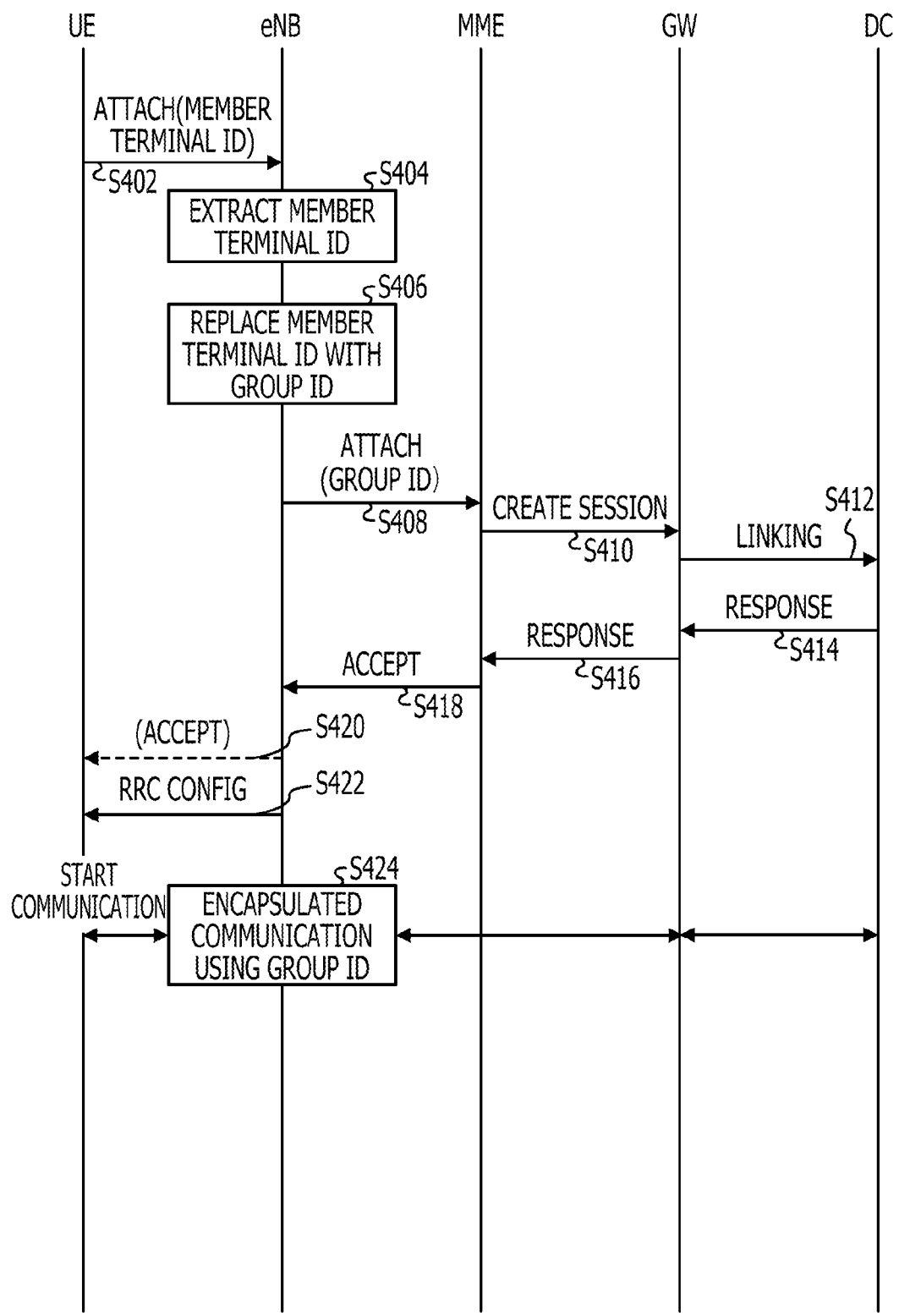
FIG. 4 is a diagram illustrating an example of the sequence of a multiplexing process when, in the wireless communication system, in a state in which none of a plurality of member UEs are performing communication, one of the member UEs starts communication.

FIG. 4 is a diagram illustrating an example of the sequence of a multiplexing process when, in a state where none of the member UEs belonging to the multiplexing terminal group are performing communication in the wireless communication system 200, one of the member UEs starts communication.

In step S402, one of the member UEs 204-1 to 204-$n$ within the wireless area of the wireless base station (hereinafter also referred to as "eNB") 202 sends a connection request signal Attach that requests connection with the data center (DC) 214 to the wireless base station 202. The connection request signal Attach includes the member terminal ID of the member UE section 204, which indicates the source, and identification information (ID) of the data center 214, which indicates the destination.

Next in step S404, the wireless receiving section 312 of the wireless base station 202 receives the connection request signal Attach from the member UE section 204 thereunder. The member terminal determining section 304 extracts the member terminal ID included in the received connection request signal Attach.

Next in step S406, the member terminal determining section 304 determines whether there exists, among member terminal IDs supplied from the multiplexing controller 332, an ID that coincides with the extracted member terminal ID. Note that the multiplexing controller 332 shares beforehand group constituent information that includes the member terminal IDs and the group ID with the multiplexing controller 232 in the data center 214.

Because the connection request signal is sent from the member UE section 204 belonging to the multiplexing terminal group in the example illustrated in FIG. 4, the member terminal determining section 304 performs a coincidence determination. On the basis of the coincidence determination, the member terminal determining section 304 notifies the multiplexing controller 332 of the fact that the received connection request signal is a signal from the member UE section, and the extracted member terminal ID. On the basis of the notification from the member terminal determining section 304, the multiplexing controller 332 determines that the member UE section that has sent the connection request signal is a UE section serving as a target of data multiplexing.

On the basis of the coincidence determination performed by the member terminal determining section 304, the multiplexing controller 332 starts, based on the group ID supplied to the data multiplexing section 306, a process of establishing a group communication link between the representative UE section of the multiplexing terminal group and the core network including the gateway 212 and MME. That is, the data multiplexing section 306 performs, under control of the multiplexing controller 332, a process of replacing the member terminal ID included in the received connection signal Attach with the group ID supplied from the multiplexing controller 332, and changes the terminal ID indicating the source of the connection request to the terminal ID of the representative UE section.

Next in step S408, the communication controller 334 of the controller 302 sends, via the network sending section 316, a connection request signal Attach that requests connection with the data center 214 to the MME. The connection request signal Attach includes, as the terminal ID indicating the source, the group ID, which is the terminal ID of the representative UE section, which has been placed as a result of replacement in step S406, and the identification information (ID) of the data center 214, which indicates the destination.

Next in step S410, when the MME receives the connection request signal Attach from the wireless base station 202, the MME sends, based on the received connection request signal Attach, a session generation request signal Create Session that requests generation of communication (session) between the representative UE section under the wireless base station 202 and the data center 214 to the gateway 212. The session generation request signal Create Session includes the group ID, which is the terminal ID of the representative UE section, as the terminal ID indicating the source, and the identification information (ID) of the data center 214, which indicates the destination.

Next in step S412, when the gateway 212 receives the session generation request signal from the MME, the gateway 212 performs, based on the received session generation request signal, a process of establishing a group communication link with the wireless base station 202. The group communication link is a communication link established between the gateway 212 and the representative UE section. In addition, based on the received session generation request signal, the gateway 212 sends a link request signal Linking that requests establishment of a communication link to the data center 214.

Next in step S414, when the data center 214 receives the link request signal from the gateway 212, the data center 214 determines, based on the received link request signal, whether to permit establishment of a communication link with the gateway 212, and sends a response signal Response in response to the received link request signal to the gateway 212. The response signal Response indicates whether the data center 214 permits establishment of a communication link with the gateway 212. In the example illustrated in FIG. 4, it is assumed that the data center 214 permits establishment of a communication link. Therefore, the data center 214 performs a process of establishing a communication link with the gateway 212, and sends a response signal that indicates permission of establishment of a communication link to the gateway 212.

Next in step S416, when the gateway 212 receives the response signal from the data center 214, the gateway 212 sends, based on the received response signal, a response signal Response in response to the received session generation request signal to the MME. The response signal Response indicates whether communication (session) between the representative UE section and the data center 214 has been established. Since establishment of a communication link between the gateway 212 and the data center 214 has been permitted in the example illustrated in FIG. 4, the gateway 212 sends a response signal indicating that communication (session) between the representative UE section and the data center 214 has been established to the MME.

Next in step S418, when the MME receives the response signal from the gateway 212, the MME sends, based on the received response signal, a response signal in response to the received connection request signal to the wireless base station 202. Since the response signal indicating that communication (session) has been established between the representative UE section and the data center 214 has been received in the example illustrated in FIG. 4, the MME sends a response signal Accept indicating that connection with the data center 214 has been permitted to the wireless base station 202.

Next in step S420, when the communication controller 334 of the controller 302 receives the response signal Accept from the MME via the network receiving section 318, the communication controller 334 recognizes that communication (session) between the representative UE section and the data center 214 has been established, and recognizes that a group communication link has been established with the core network. The wireless base station 202 may also send a response signal Accept indicating that connection with the data center 214 has been established to the member UE section 204 that has sent the connection request signal Attach in step S402.

Next in step S422, the communication controller 334 of the controller 302 sends, via the wireless sending section 314, a wireless resource control setting signal (Radio Resource Control configuration) RRC config to the member UE section 204 that has sent the connection request signal Attach in step S402. The wireless resource control setting signal RRC config is a signal indicating the settings at the wireless terminal (UE section) side, with regard to the group communication link established between the representative UE section and the core network in the individual steps illustrated in FIG. 4.

Next in step S424, the member UE section 204 that has received the wireless resource control setting signal in step S422 starts data communication with the data center 214 via the established group communication link. That is, in the wireless base station 202, the member UE section 204 performs data communication with the data center 214 via the representative UE section of the multiplexing terminal group to which the member UE section 204 belongs.

At this point, the network sending section 316 of the wireless base station 202 sends data that has been encapsulated using the group ID, which is the terminal ID of the representative UE section, to the gateway 212. That is, the data multiplexing section 306 adds header information including the group ID supplied from the multiplexing controller 332 to the data received from the member UE section 204, thereby encapsulating data to be sent. The data multiplexing section 306 performs a multiplexing process of multiplexing data to be sent to data of the representative UE section using the group ID.

In contrast, the network receiving section 318 of the wireless base station 202 receives the data encapsulated using the group ID from the gateway 212. That is, the data separation section 310 deletes, from the received data, the header information including group ID, thereby decapsulating the received data. The wireless sending section 314 of the wireless base station 202 sends the decapsulated received data to the member UE section 204 corresponding to the member terminal ID included in the main body of the received data. The data separation section 310 performs a separation process of separating the received data, which has been multiplexed to data of the representative UE section, to data of each member UE section using the member terminal ID.

When performing data communication with the member UE section 204, the data center 214 performs authentication of the terminal serving as a target of communication using, in addition to the member terminal ID, which is the terminal ID of the member UE section 204, the group ID, which is the terminal ID of the representative UE section. That is, the data center 214 recognizes the member UEs 204-1 to 204-n originally serving as targets of communication as being bound together by the single representative UE section, and the data center 214 operates as if, while authenticating each member UE section, the data center 214 sends and receives data to and from the representative UE section, instead of the individual member UEs.

As has been described above, with regard to the wireless base station 202, when a new connection request is made from a member UE section 204 belonging to the multiplexing terminal group, a group communication link is established between the representative UE section and the core network, and, that member UE section 204 is enabled to perform data communication with the data center 214 via the established group communication link.

Therefore, with regard to the group communication controller 222 of the wireless base station 202, for a plurality of wireless terminals (UEs) thereunder, the number of UEs whose data may be multiplexed may be increased, and the number of communication links to be established with the core network may be decreased.

1-3-2. When at Least One of Member UEs is Performing Communication

Figure 5:
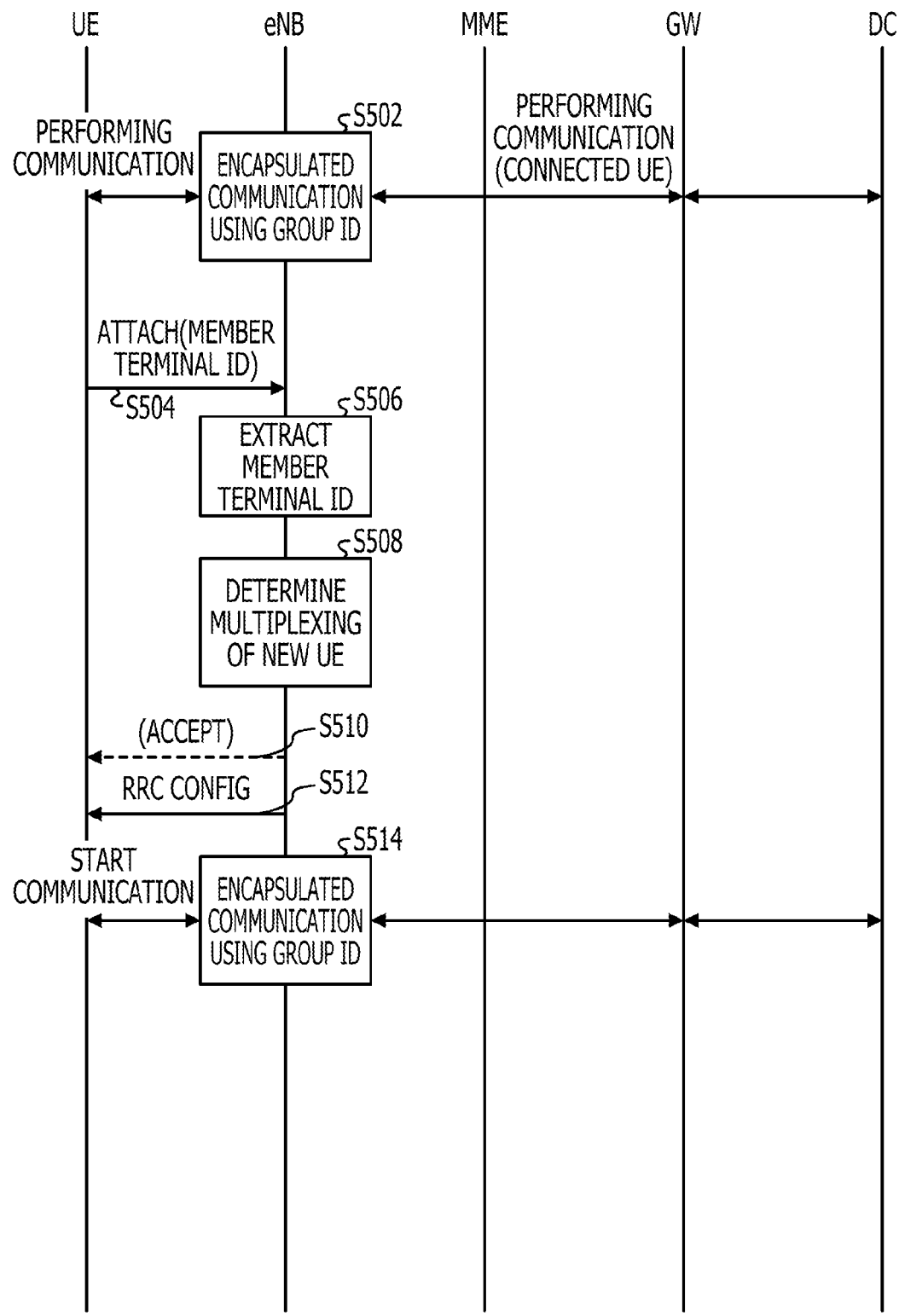
FIG. 5 is a diagram illustrating an example of the sequence of a multiplexing process when, in the wireless communication system, in a state in which at least one of the member UEs is performing communication, another one of the member UEs starts new communication.

FIG. 5 is a diagram illustrating an example of the sequence of a multiplexing process when, in a state where at least one of the member UEs belonging to the multiplexing terminal group is performing communication in the wireless communication system 200, another member UE section starts new communication.

First in step S502, one (already connected UE section) of the member UEs belonging to the multiplexing terminal group is performing data communication with the data center 214 via an established group communication link. At this point, the wireless base station 202 sends data that has been encapsulated using the group ID, which is the terminal ID of the representative UE section, to the gateway 212. Also, the wireless base station 202 receives data that has been encapsulated using the group ID from the gateway 212.

Next in step S504, one member UE section (new member UE section), other than the already connected member UE section, among the member UEs sends a connection request Attach that requests connection with the data center 214 to the wireless base station 202. The connection request signal Attach includes the member terminal ID of the member UE section 204, which indicates the source, and identification information (ID) of the data center 214, which indicates the destination.

Next in step S506, the wireless receiving section 312 of the wireless base station 202 receives the connection request signal Attach from the new member UE section thereunder. The member terminal determining section 304 extracts the member terminal ID included in the received connection request signal Attach.

Next in step S508, the member terminal determining section 304 determines whether there exists, among member terminal IDs supplied from the multiplexing controller 332, an ID that coincides with the extracted member terminal ID.

Since the connection request signal has been sent from the member UE section belonging to the multiplexing terminal group in the example illustrated in FIG. 5, the member terminal determining section 304 performs a coincidence determination. On the basis of the coincidence determination, the member terminal determining section 304 notifies the multiplexing controller 332 of the fact that the received connection request signal is a signal from the member UE section, and the extracted member terminal ID. On the basis of the notification from the member terminal determining section 304, the multiplexing controller 332 determines that the new member UE section that has sent the connection request signal is a UE section serving as a target of data multiplexing.

Next in step S510, the communication controller 334 of the wireless base station 202 recognizes that communication (session) between the representative UE section and the data center 214 has been established, and there exists an existing group communication link between the representative UE section and the core network, which is used by the already connected member UE section for data communication. Therefore, the communication controller 334 decides to allocate the existing communication link to the new member UE section as a communication link used for data communication. The wireless base station 202 may also send a response signal Accept indicating that connection with the data center 214 has been established to the member UE section 204 that has sent the connection request signal Attach in step S504.

Next in step S512, the wireless base station 202 sends a wireless resource control setting signal RRC config to the new member UE section that has sent the connection request signal Attach in step S504. The wireless resource control setting signal RRC config is a signal indicating the settings at the wireless terminal side, with regard to the group communication link established between the representative UE section and the core network.

Next in step S514, the new member UE section which has received the wireless resource control setting signal in step S512 starts data communication with the data center 214 via the existing group communication link. That is, the new member UE section performs data communication with the data center 214 via the representative UE section of the multiplexing terminal group to which the new member UE section belongs, while sharing the existing group communication link with the already connected member UE section.

At this point, the wireless base station 202 sends data that has been encapsulated using the group ID, which is the terminal ID of the representative UE section, to the gateway 212, and receives data that has been encapsulated using the group ID from the gateway 212. When performing data communication with the member UE section 204, the data center 214 performs authentication of the terminal serving as a target of communication using, in addition to the member terminal ID, which is the terminal ID of the member UE section 204, the group ID, which is the terminal ID of the representative UE section.

As has been described above, with regard to the wireless base station 202, when there is a connection request from another member UE section 204 belonging to the multiplexing terminal group in a state where a group communication link has been established between the representative UE section and the core network, that member UE section 204 is enabled to perform data communication with the data center 214 via the already established existing group communication link.

Therefore, with regard to the wireless base station 202, for a plurality of wireless terminals (UEs) thereunder, the number of UEs whose data may be multiplexed may be increased, and the number of communication links to be established with the core network may be decreased.

1-4. Flow of Multiplexing Process Performed by Wireless Base Station 202

Next, the flow of a multiplexing process performed by the group communication controller 222 of the wireless base station 202 will be described.

Figure 6:
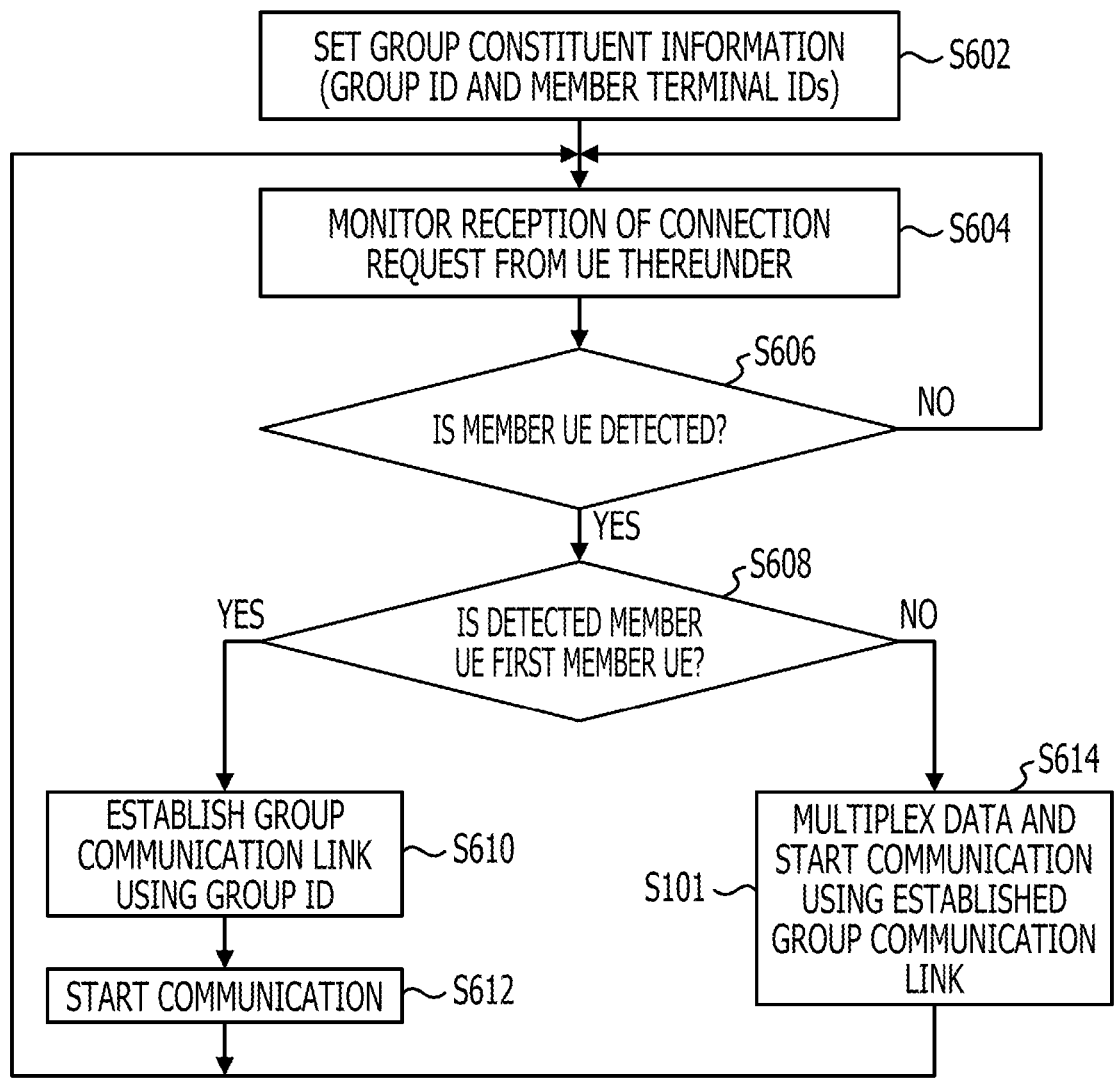
FIG. 6 is a flowchart of a multiplexing process performed by a group communication controller.

FIG. 6 is a flowchart of a multiplexing process performed by the group communication controller 222.

First in step S602, the multiplexing controller 332 of the group communication controller 222 sets, therein, the group constituent information of the multiplexing terminal group under the wireless base station 202. As has been described above, the set group constituent information is the same as the group constituent information held by the multiplexing controller 232 in the data center 214, and the group constituent information includes the group ID (group identification information) and the member terminal IDs (member terminal identification information).

Next in step S604, the member terminal determining section 304 of the group communication controller 222 monitors whether a connection request for the data center 214 has been received from the UEs 204 and 206 within the wireless area of the wireless base station 202.

Next in step S606, when a connection request has been received, the member terminal determining section 304 determines whether a member UE section 204 of the multiplexing terminal group has been detected as the source UE section of the received connection request. That is, the member terminal determining section 304 determines whether the terminal ID included in the received connection request coincides with any of the member terminal IDs supplied from the multiplexing controller 332. When a member UE section 204 has been detected, the process proceeds to step S608. When no member UE section 204 has been detected, the process returns to step S604, and the member terminal determining section 304 continues monitoring a connection request.

Next in step S608, the multiplexing controller 332 of the group communication controller 222, which has been notified by the member terminal determining section 304 of the fact that the member UE section 204 has been detected as the source UE section of the connection request, determines whether the detected member UE section 204 is the first member UE section among the member UEs 204-1 to 204-n belonging to the multiplexing terminal group. That is, the multiplexing controller 332 determines whether a connection request has been received from one of the member UEs 204-1 to 204-n belonging to the multiplexing terminal group in a state in which none of the member UEs 204-1 to 204-n are performing data communication. When the detected member UE section is the first member UE section, the process proceeds to step S610. When the detected member UE section is not the first member UE section, the process proceeds to step S614.

Next in step S610, the communication controller 334 of the group communication controller 222 establishes a group communication link between the representative UE section of the multiplexing terminal group and the core network based on the group ID supplied by the multiplexing controller 332 to the data multiplexing section 306. That is, the data multiplexing section 306 performs, under control of the multiplexing controller 332, a process of replacing the member terminal ID included in the received connection signal with the group ID, which is the terminal ID of the representative UE section, and the communication controller 334 establishes a group communication link between the representative UE section and the core network based on the connection request including the replacement.

Next in step S612, the member UE section 204 that has sent the connection request starts data communication with the data center 214 via the established group communication link. That is, the member UE section 204 performs data communication with the data center 214 via the representative UE section of the multiplexing terminal group to which the member UE section 204 belongs.

At this point, the wireless base station 202 sends data that has been encapsulated using the group ID, which is the terminal ID of the representative UE section, to the gateway 212, and receives data that has been encapsulated using the group ID from the gateway 212. When performing data communication with the member UE section 204, the data center 214 performs authentication of the terminal serving as a target of communication using, in addition to the member terminal ID, which is the terminal ID of the member UE section 204, the group ID, which is the terminal ID of the representative UE section.

In contrast, in step S614, the communication controller 334 recognizes that there exists an existing group communication link established between the representative UE section of the multiplexing terminal group and the core network based on the group ID. The member UE section 204 which has sent the connection request starts data communication with the data center 214 via the established group communication link. That is, the member UE section 204 performs data communication with the data center 214 via the representative UE section of the multiplexing terminal group to which the member UE section 204 belongs.

At this point, the wireless base station 202 sends data that has been encapsulated using the group ID, which is the terminal ID of the representative UE section, to the gateway 212, and receives data that has been encapsulated using the group ID from the gateway 212. When performing data communication with the member UE section 204, the data center 214 performs authentication of the terminal serving as a target of communication using, in addition to the member terminal ID, which is the terminal ID of the member UE section 204, the group ID, which is the terminal ID of the representative UE section.

After step S612 and step S614, the process returns to step S604, and the member terminal determining section 304 continues monitoring a connection request.

As has been described above, with regard to the wireless base station 202, when there are connection requests from member UEs 204 belonging to the multiplexing terminal group, the individual member UEs 204 are enabled to perform data communication with the data center 214 via a single group communication link established between the representative UE section and the core network.

Therefore, with regard to the wireless base station 202, for a plurality of wireless terminals (UEs) thereunder, the number of UEs whose data may be multiplexed may be increased, and the number of communication links to be established with the core network may be decreased.

1-5. Modification of Sequence of Multiplexing Process

Next, a modification of the sequence of the data communication process performed in the wireless communication system 200, which is illustrated in FIG. 4, will be described.

When LTE of 3GPP is adopted as the communication specification, a terminal ID used in a process of establishing a communication link between a UE section in the wireless area of the wireless base station 202 and the core network may be of a different type from a terminal ID used in authentication in the actual data communication. In such a case, the sequence of changing and setting the terminal ID of each UE section will be described.

Hereinafter, the case in which an International Mobile Subscriber Identity (IMSI) or a Temporary Mobile Subscriber Identity (TMSI) is used as a terminal ID used in a process of establishing a communication link with the core network, and an IP address is used as a terminal ID used in authentication in the actual data communication will be described by way of example. However, terminal IDs are not limited thereto, and any IDs may be used as long as they are IDs that may be used in authentication or the like.

Figure 7:
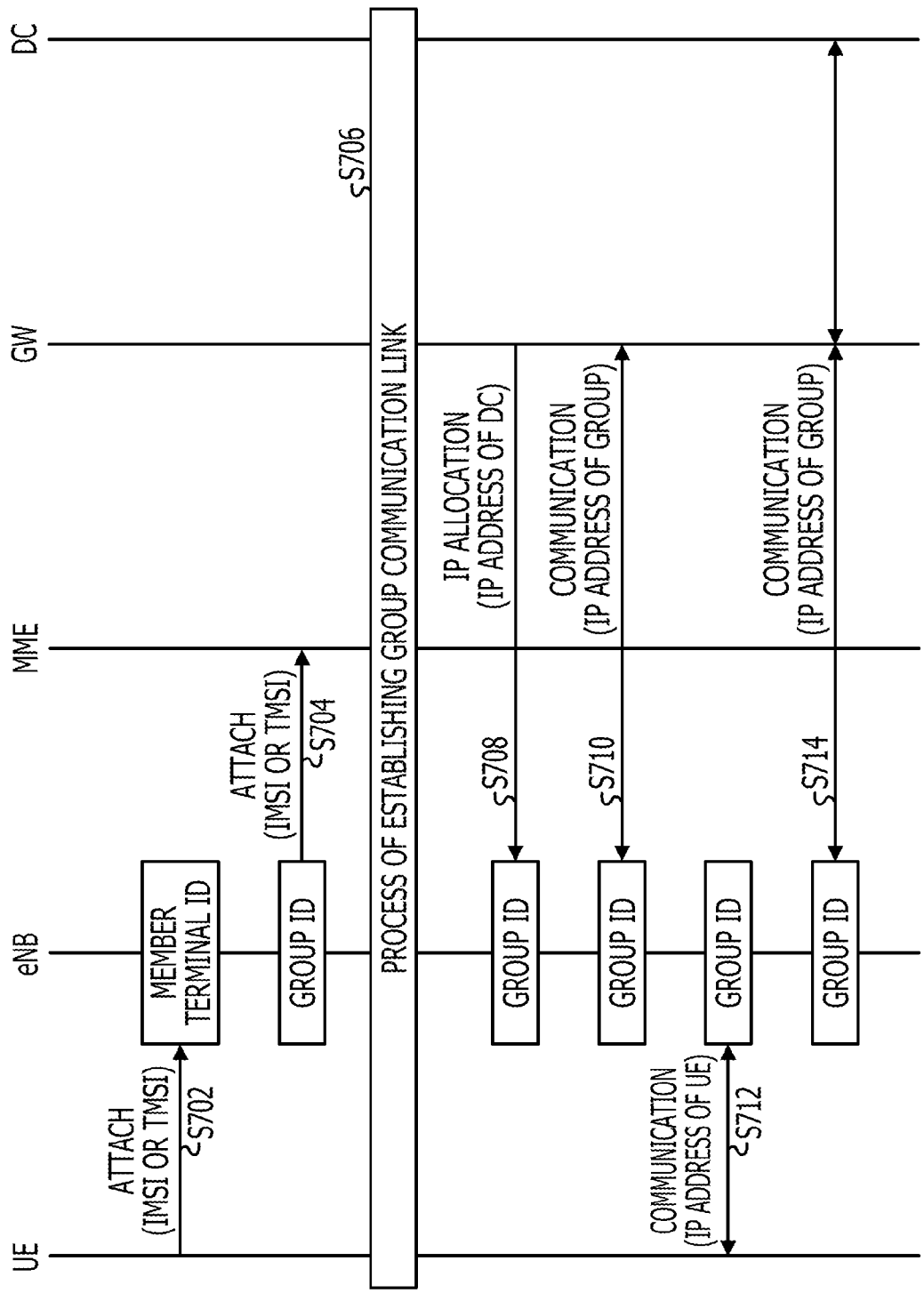
FIG. 7 is a diagram illustrating an example of the sequence for setting a terminal identification (ID) of each UE section when a terminal ID used in a process of establishing a communication link is different from a terminal ID used in authentication performed in data communication in the wireless communication system.

FIG. 7 is a diagram illustrating an example of the sequence of setting a terminal ID of each UE section when a terminal ID used in a communication link establishment process is different from a terminal ID used in authentication in data communication.

First in step S702, as in step S402 illustrated in FIG. 4, one of the member UEs 204-1 to 204-n sends a connection request signal Attach that requests connection with the data center 214 to the wireless base station 202. Here, the connection request signal Attach illustrated in FIG. 7 includes the IMSI or TMSI of the member UE section as the member terminal ID of the member UE section, which indicates the source. An IMSI is an identification number unique to each terminal, which is allocated to each wireless terminal. A TMSI is a temporary identification number allocated by the MME when each wireless terminal connects to a wireless network.

Next in step S704, as in steps S404 and S406 illustrated in FIG. 4, the wireless base station 202 performs a process of extracting the IMSI or TMSI of the member UE section, which is included in the received connection request signal Attach, and replacing the extracted IMSI or TMSI of the member UE section with the IMSI or TMSI of the representative UE section. Note that the multiplexing controller 332 of the wireless base station 202 shares beforehand group constituent information that includes the member terminal IDs and the group ID where IMSIs or TMSIs are used with the multiplexing controller 232 in the data center 214.

Thereafter, as in step S408 illustrated in FIG. 4, the wireless base station 202 sends a connection request signal Attach that requests connection with the data center 214 to the MME. The connection request signal Attach includes, as the terminal ID indicating the source, the IMSI or TMSI of the representative UE section.

Next in step S706, as in steps S410 to S422 illustrated in FIG. 4, a process of establishing a group communication link between the representative UE section and the core network is performed, and communication (session) is established between the representative UE section and the data center 214. Note that, in step S706, the IMSI or TMSI of the representative UE section is used instead of the group ID of the representative UE section.

Next in step S708, after the group communication link has been established, the gateway 212 notifies the wireless base station 202 of the IP address of the data center 214. Accordingly, the communication controller 334 of the wireless base station 202 recognizes the IP address allocated to the data center 214.

Next in step S710, the wireless base station 202 is notified by the gateway 212 of the IP address of the representative UE section. Accordingly, the communication controller 334 recognizes the IP address allocated to the representative UE section. Thereafter, the representative UE section performs data communication with the gateway 212 using the allocated IP address. That is, each member UE section within the wireless area of the wireless base station 202 performs data communication with the gateway 212 via the representative UE section to which the IP address has been allocated. When performing data communication with a member UE section, the gateway 212 performs authentication of the terminal serving as a target of communication using the IP address of the representative UE section.

Next in step S712, each member UE section within the wireless area of the wireless base station 202 is notified by the wireless base station 202 of an IP address that has been set beforehand by the gateway 212 to uniquely recognize each member UE section and that has been shared with the wireless base station 202, and, using the IP address given in the notification, sends and receives data to and from the wireless base station 202. In the wireless base station 202, the IP address of each member UE section is an address set beforehand for performing a multiplexing process, which is set for each member UE section and held in the multiplexing controller 332. Information of the IP address of each member UE section, which is held in the multiplexing controller 332 of the wireless base station 202, is sent beforehand to the data center 214 and is shared between the wireless base station 202 and the data center 214.

Next in step S714, the member terminal determining section 304 of the wireless base station 202 compares the IP address included in data received from the member UE section thereunder with IP addresses set beforehand in the multiplexing controller 332, and determines whether the received data has been sent from a member UE section belonging to the multiplexing terminal group. When it is determined based on a coincidence determination by the member terminal determining section 304 that the received data is data to be multiplexed, the data multiplexing section 306 performs a multiplexing process of multiplexing the received data to data of the representative UE section using the IP address of the representative UE section, which is supplied from the multiplexing controller 332. The data multiplexing section 306 encapsulates the received data by adding header information including the IP address of the representative UE section. The wireless base station 202 sends the encapsulated received data to the data center 214 via the gateway 212.

Also, the wireless base station 202 receives encapsulated data from the data center 214 via the gateway 212. The terminal group determining section 308 of the wireless base station 202 compares the IP address of the representative UE section, which is included in the header information of the received data, with the IP address received from the gateway 212 in step S710, and determines whether the received data is encapsulated data that has been sent to a member UE section belonging to the multiplexing terminal group. When it has been determined that the received data is encapusulated data addressed to a member UE section, the data separation section 310 performs a separation process of separating the received data into data of each member UE section using the IP address of the member UE section, which is included in the main body of the received data. The data separation section 310 decapsulates the received data by deleting, from the received data, the header information including the IP address of the representative UE section.

2. Second Embodiment

Hereinafter, a wireless base station and a wireless communication system according to a second embodiment will be described.

2-1. Wireless Communication System

Figure 8:
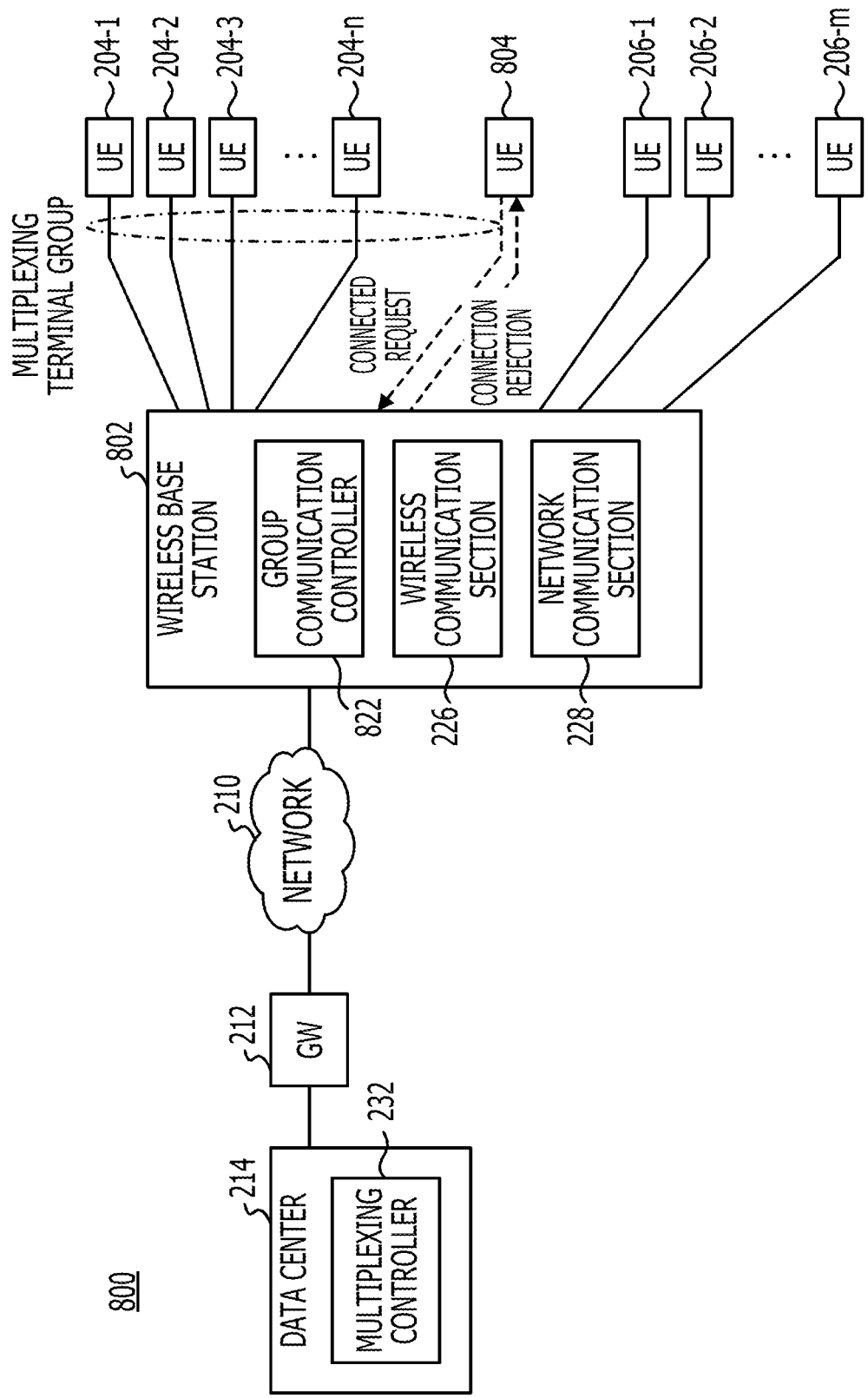
FIG. 8 is a diagram illustrating an example of the configuration of a wireless communication system according to a second embodiment.

First, the overall configuration of a wireless communication system 800 according to the second embodiment will be described. FIG. 8 is a diagram illustrating an example of the configuration of the wireless communication system 800 according to the second embodiment.

The wireless communication system 800 illustrated in FIG. 8 is the same as the wireless communication system 200 illustrated in FIG. 2 except for the point that the wireless communication system 800 includes a group communication controller 822 and a wireless base station 802 instead of the group communication controller 222 and the wireless base station 202. Portions in FIG. 8 that are the same as or that correspond to those in the wireless communication system 200 illustrated in FIG. 2 are indicated with the same reference numerals. Because the operation and functions of portions that are indicated with the same reference numerals in FIG. 8 are as those described using FIG. 2, detailed descriptions thereof are omitted.

As with the wireless base station 202 illustrated in FIG. 2, the wireless base station 802 establishes a communication link between the plural UEs 204 and 206 thereunder and the core network via the network 210, and performs data communication with the data center 214 via the established communication link.

In the wireless base station 802, the group communication controller 822 has the same functions as those of the group communication controller 222 in the wireless base station 202, and controls establishment of a communication link between the plural UEs 204 and 206 thereunder and the core network.

In addition to the functions of the group communication controller 222, the group communication controller 822 further has the function of evaluating, when there is a connection request from a member UE section (new member UE section) 804 different from an already connected member UE section in a state in which a group communication link has already been established, the communication quality (quality of service, QoS) of that group communication link. That is, the group communication controller 822 evaluates the communication quality QoS of the group communication link when data from the new member UE section is multiplexed to data of the representative UE section with which communication (session) with the data center 214 has been established.

When the evaluated communication quality is deteriorated and is less than a certain threshold, the group communication controller 822 does not determine that the new member UE section 804 is a UE section serving as a target of data multiplexing, and rejects the connection request from the new member UE section 804. The details of evaluation of the communication quality QoS of the group communication link will be described later.

2-2. Wireless Base Station

Figure 9:
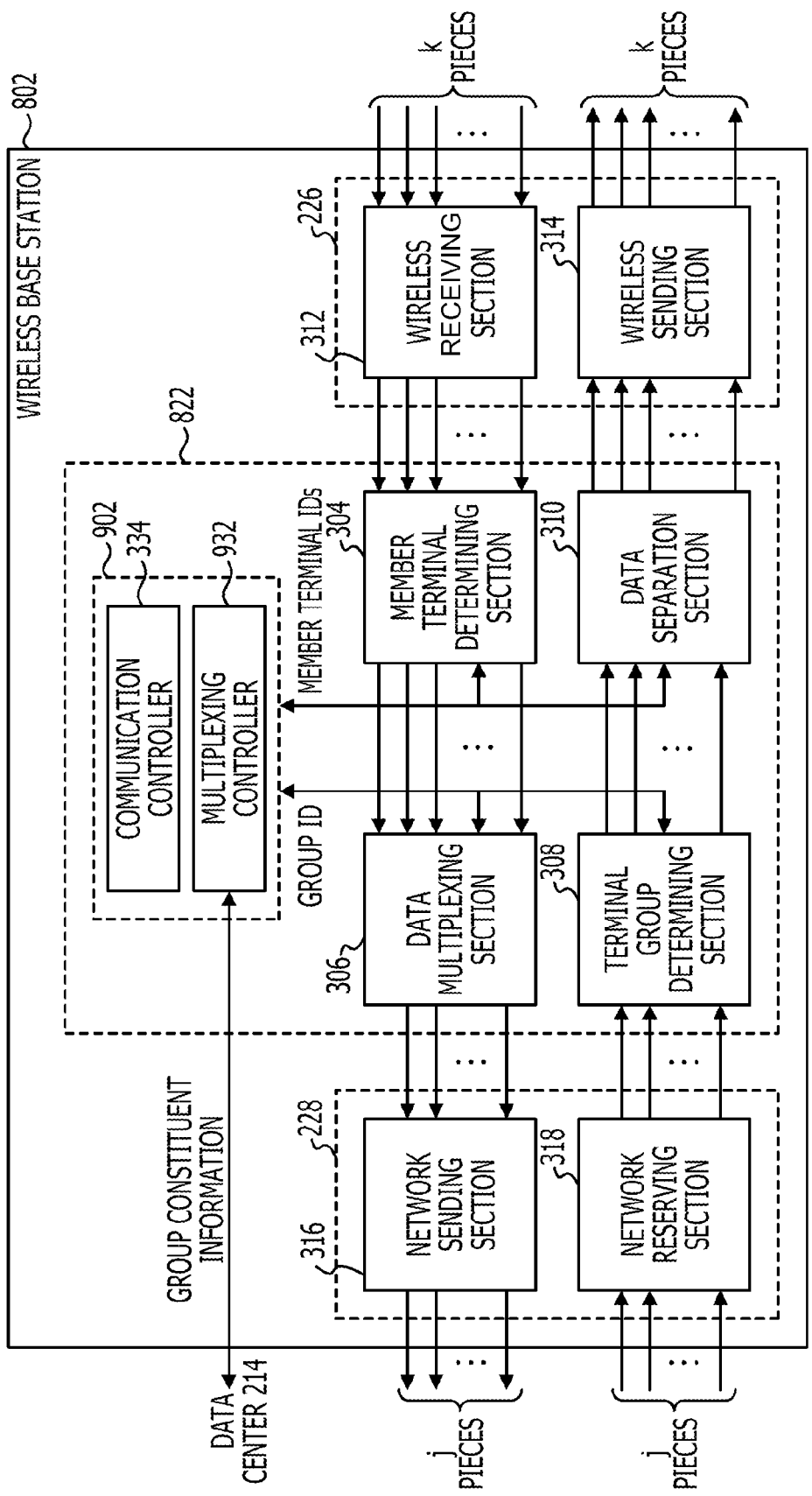
FIG. 9 is a diagram illustrating an example of the configuration of a wireless base station according to the second embodiment.

Next, the details of the configuration of the wireless base station 802 according to the second embodiment will be described. FIG. 9 is a diagram illustrating an example of the configuration of the wireless base station 802 according to the second embodiment.

As illustrated in FIG. 9, the configuration of the wireless base station 802 is the same as the configuration of the wireless base station 202 illustrated in FIG. 3 except for the point that a controller 902 is provided in the group communication controller 822 and a multiplexing controller 932 is provided in the controller 902, instead of the point that the controller 302 is provided in the group communication controller 222 and the multiplexing controller 332 is provided in the controller 302. Because the operation and functions of portions that are indicated with the same reference numerals in FIG. 9 are as those described using FIG. 3, detailed descriptions thereof are omitted.

In the group communication controller 822, the multiplexing controller 932 in the controller 902 has the same functions as those of the multiplexing controller 332 in the controller 302, holds the same group constituent information (member terminal IDs and group ID) as that held by the multiplexing controller 232 in the data center 214 illustrated in FIG. 8, and controls a process of multiplexing pieces of data sent from the member UEs 204-1 to 204-n.

In addition to the functions of the multiplexing controller 332, the multiplexing controller 932 further has the function of evaluating, when there is a connection request from a new member UE section 804 in a state in which a group communication link has already been established, the communication quality QoS of that group communication link. That is, the multiplexing controller 932 in the group communication controller 822 evaluates the communication quality QoS of the group communication link when data from the new member UE section is multiplexed to data of the representative UE section with which communication (session) with the data center 214 has been established.

The communication quality QoS is, for example, the number of member UEs that are concurrently targets of data multiplexing with respect to the representative UE section and that are already sending data via a group communication link (the number of UEs to be multiplexed), that is, the degree of data multiplexing with respect to the representative UE section. When the number of member UEs to be multiplexed (the degree of data multiplexing with respect to the representative UE section) exceeds a certain upper limit, the amount of data sent and received via the group communication link increases, resulting in an increased delay amount in data transfer that occurs in the wireless base station 802. This increases the probability of deterioration of the communication quality.

As has been described with regard to the member terminal determining section 304 in the group communication controller 222 illustrated in FIG. 3, the member terminal determining section 304 determines, every time a new connection request is received by the wireless receiving section 312, whether the received connection request is issued by a member UE section belonging to the multiplexing terminal group, and notifies the multiplexing controller 932 of the determination result and a terminal ID included in the received connection request.

On the basis of the determination result and the terminal ID given in the notification from the member terminal determining section 304, the multiplexing controller 932 occasionally determines the number of member UEs to be multiplexed. When the number of member UEs to be multiplexed exceeds the predetermined upper limit, the multiplexing controller 932 determines that the communication quality QoS of the group communication link is deteriorated and is less than the certain threshold. The upper limit of the number of member UEs to be multiplexed is, for example, a value that is set beforehand for each multiplexing terminal group and is held in the multiplexing controller 932.

When the number of member UEs to be multiplexed exceeds the predetermined upper limit, the multiplexing controller 932 does not determine that the new member UE section 804 is a UE section serving as a target of data multiplexing, and instructs the data multiplexing section 306 not to perform a multiplexing process. The multiplexing controller 932 decides to reject the connection request from the new member UE section 804, and sends a response signal indicating rejection of the connection request to the new member UE section 804 via the wireless sending section 314.

Note that the communication quality QoS is not limited to the above-described number of member UEs to be multiplexed, that is, the degree of data multiplexing with respect to the representative UE section. The communication quality QoS may be, for example, a delay amount in packet transfer in the wireless base station 802 for packet data from a member UE section. In this case, the multiplexing controller 932 monitors a delay amount in packet transfer of each piece of packet data from a member UE section, and, when the delay amount in packet transfer exceeds a certain threshold, determines that the communication quality QoS is deteriorated.

As has been described above, with regard to the group communication controller 822 in the wireless base station 802, when there is a connection request from a member UE section 804 belonging to the multiplexing terminal group, the communication quality of a group communication link established between the representative UE section and the core network is evaluated, and whether the connection request is to be permitted is determined based on the evaluation result. Therefore, the number of communication links established with the core network may be reduced, while, for a plurality of wireless terminals (UEs) thereunder, the quality of communication with the core network may be maintained to be greater than or equal to the certain threshold.

2-3. Sequence of Multiplexing Process

Next, the sequence of a multiplexing process performed in the wireless communication system 800 will be described.

Figure 10:
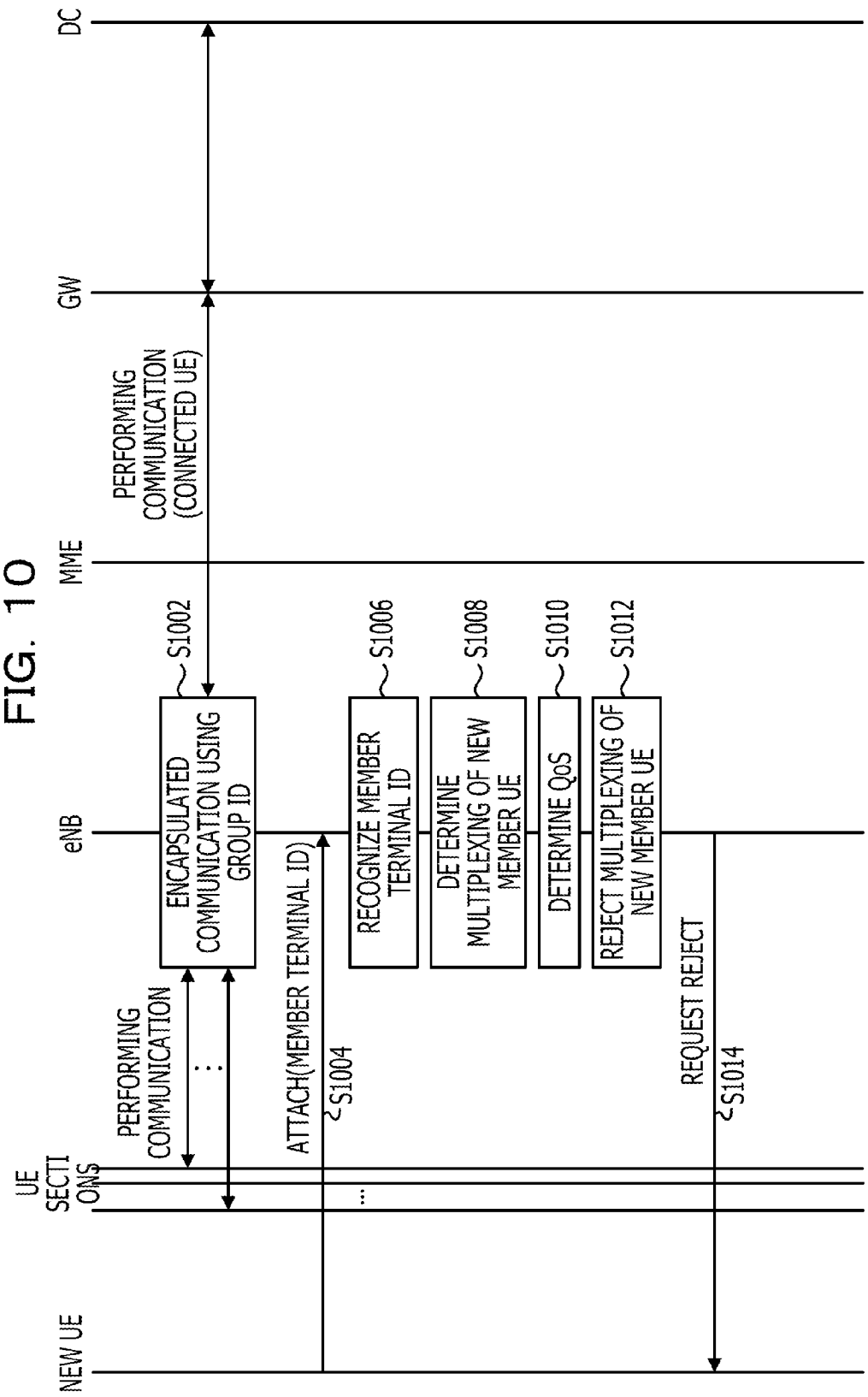
FIG. 10 is a diagram illustrating an example of the sequence of a data communication process when, in the wireless communication system, in a state in which a group communication link has already been established, the wireless base station receives a connection request signal from a new member UE section.

FIG. 10 is a diagram illustrating an example of the sequence of a multiplexing process when the wireless base station 802 receives a connection request signal from the new member UE section 804 in a state in which a group communication link has already been established.

First in step S1002, at least one of the member UEs belonging to the multiplexing terminal group (already connected member UE section) is performing data communication with the data center 214 via the established communication link. At this point, the wireless base station 802 sends data that has been encapsulated using the group ID, which is the terminal ID of the representative UE section, to the gateway 212. Also, the wireless base station 802 receives data that has been encapsulated using the group ID from the gateway 212.

Next in step S1004, one member UE section (new member UE section) 804, other than the already connected member UE section, among the member UEs sends a connection request Attach that requests connection with the data center 214 to the wireless base station 802. The connection request signal Attach includes the member terminal ID of the member UE section 804, which indicates the source.

Next in step S1006, the wireless receiving section 312 of the wireless base station 802 receives the connection request signal Attach from the new member UE section 804 thereunder. The member terminal determining section 304 extracts the member terminal ID included in the received connection request signal Attach.

Next in step S1008, the member terminal determining section 304 determines whether there exists, among member terminal IDs supplied from the multiplexing controller 932, an ID that coincides with the extracted member terminal ID.

Since the connection request signal has been sent from the member UE section belonging to the multiplexing terminal group in the example illustrated in FIG. 10, the member terminal determining section 304 performs a coincidence determination. On the basis of the coincidence determination, the member terminal determining section 304 notifies the multiplexing controller 932 of the fact that the received connection request signal is a signal from the member UE section, and the extracted member terminal ID. On the basis of the notification from the member terminal determining section 304, the multiplexing controller 932 determines that the new member UE section that has sent the connection request signal is a UE section serving as a target of data multiplexing.

Next in step S1010, upon notification from the member terminal determining section 304 in step S1008, the multiplexing controller 932 recognizes that the current value of the number of member UEs serving as targets of data multiplexing with respect to the representative UE section (the number of member UEs to be multiplexed) has increased by one. The multiplexing controller 932 compares the current value of the number of member UEs to be multiplexed with a predetermined upper limit, and determines whether the current value of the number of member UEs to be multiplexed exceeds the upper limit. When the current value of the number of member UEs to be multiplexed exceeds the upper limit, the multiplexing controller 932 determines that the communication quality QoS of the group communication link is deteriorated and is less than a certain threshold.

In the example illustrated in FIG. 10, it is assumed that the current value of the number of member UEs to be multiplexed exceeds the above-described upper limit. Therefore, the multiplexing controller 932 determines that the communication quality QoS of the group communication link is deteriorated and is less than the certain threshold.

Next in step S1012, in response to the determination in step S1010 that the communication quality QoS of the group communication link is deteriorated, the multiplexing controller 932 decides that the new member UE section 804 is not to be a target of data multiplexing, and data from the new member UE section 804 is not to be multiplexed to data of the representative UE section. That is, the multiplexing controller 932 decides to reject the connection request from the new member UE section 804.

Next in step S1014, the multiplexing controller 932 sends a response signal Request reject in response to the connection request signal received in step S1006 to the new member UE section 804 via the wireless sending section 314. The response signal Request reject is a signal indicating that connection is rejected in response to the connection request sent from the new member UE section 804.

As has been described above, with regard to the wireless base station 802, when there is a connection request from a member UE section 804 belonging to the multiplexing terminal group, the communication quality of a group communication link established between the representative UE section and the core network is evaluated, and, when the evaluation result indicates that the communication quality is deteriorated and is less than a certain threshold, the connection request may be rejected.

Therefore, with regard to the wireless base station 802, the number of communication links established with the core network may be reduced, while, for a plurality of wireless terminals (UEs) thereunder, the quality of communication with the core network may be maintained to be greater than or equal to the certain threshold.

2-4. Flow of Multiplexing Process Performed by Wireless Base Station 802

Next, the flow of a multiplexing process performed by the group communication controller 822 in the wireless base station 802 will be described.

Figure 11:
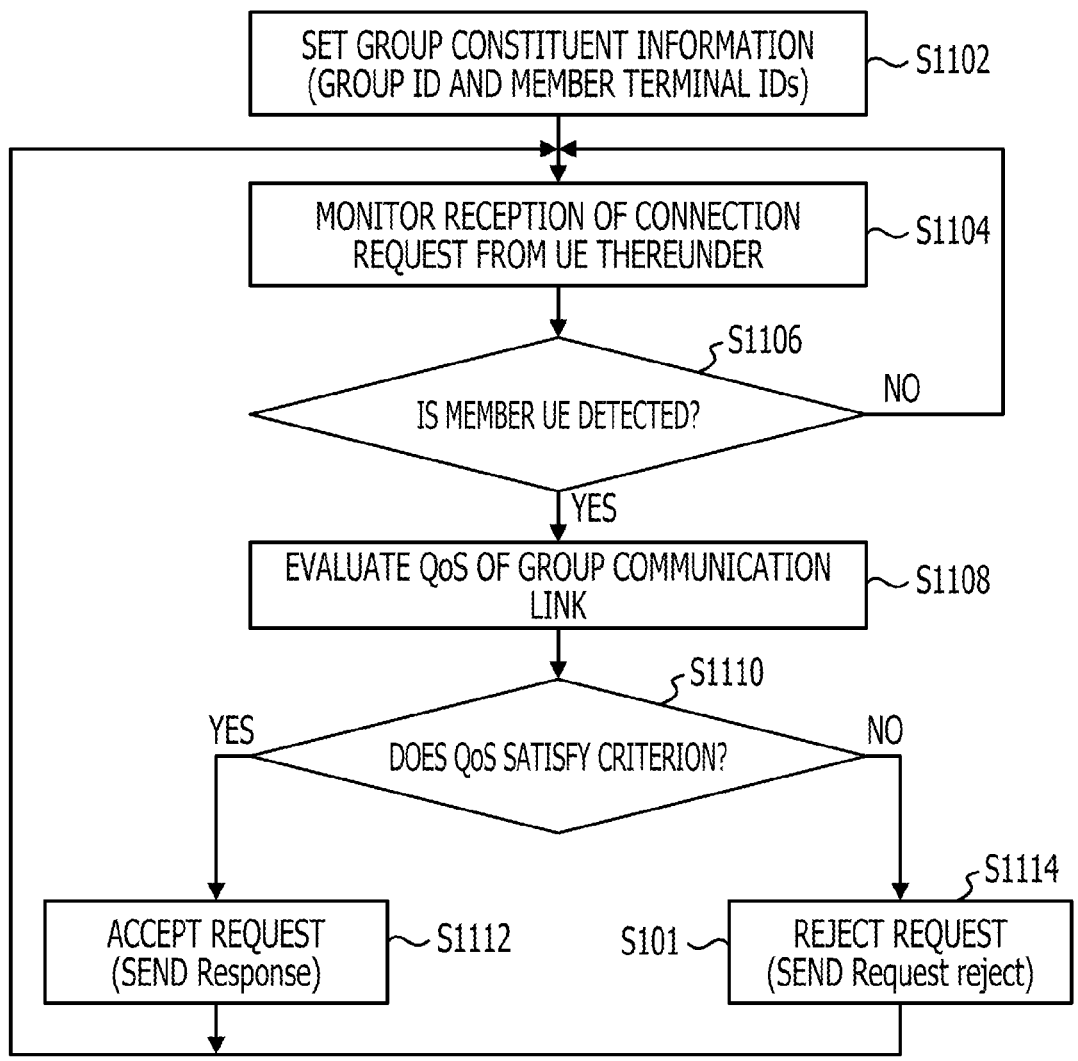
FIG. 11 is a flowchart of a multiplexing process performed by a group communication controller.

FIG. 11 is a flowchart of a multiplexing process performed by the group communication controller 822.

First in step S1102, the multiplexing controller 932 of the group communication controller 822 sets, therein, the group constituent information of the multiplexing terminal group under the wireless base station 802. As has been described above, the group constituent information is the same as the group constituent information held by the multiplexing controller 232 in the data center 214, and the group constituent information includes the group ID (group identification information) and the member terminal IDs (member terminal identification information).

Next in step S1104, the member terminal determining section 304 of the group communication controller 822 monitors whether a connection request for the data center 214 has been received from the UEs 204, 804, and 206 within the wireless area of the wireless base station 202.

Next in step S1106, when a connection request has been received, the member terminal determining section 304 determines whether a member UE section 204 or 804 of the multiplexing terminal group has been detected as the source UE section of the received connection request. That is, the member terminal determining section 304 determines whether the terminal ID included in the received connection request coincides with any of the member terminal IDs supplied from the multiplexing controller 932. When a member UE section 204 or 804 has been detected, the process proceeds to step S1108. When no member UE section 204 or 804 has been detected, the process returns to step S1104, and the member terminal determining section 304 continues monitoring a connection request.

Next in step S1108, the multiplexing controller 932 receives a notification from the member terminal determining section 304 of the fact that the new member UE section 204 or 804 has been detected as the source UE section of the connection request, and the member terminal ID of the new member UE section. On the basis of the received notification, the multiplexing controller 932 evaluates the communication quality QoS of the group communication link.

The communication quality QoS is, for example, the number of member UEs that are concurrently targets of data multiplexing with respect to the representative UE section (the number of member UEs to be multiplexed), that is, the degree of data multiplexing with respect to the representative UE section. On the basis of the notification from the member terminal determining section 304, the multiplexing controller 932 determines that the current value of the number of member UEs to be multiplexed has increased by one.

Next in step S1110, the multiplexing controller 932 determines whether the evaluated communication quality QoS satisfies a predetermined criterion. For example, the multiplexing controller 932 compares the current value of the number of member UEs to be multiplexed with a predetermined upper limit, and determines whether the current value of the number of member UEs to be multiplexed exceeds the upper limit. When the current value of the number of member UEs to be multiplexed exceeds the upper limit, the multiplexing controller 932 determines that the communication quality QoS of the group communication link does not satisfy the criterion. When the communication quality QoS satisfies the criterion, the process proceeds to step S1112. When the communication quality QoS does not satisfy the criterion, the process proceeds to step S1114.

Next in step S1112, the multiplexing controller 932 determines that the new member UE section 204 is a UE section serving as a target of data multiplexing, and sends a response signal Response indicating that connection is permitted to the new member UE section 204 via the wireless sending section 314. The multiplexing controller 932 further performs a data multiplexing process through processing similar to that in steps S608 to S614 illustrated in FIG. 6, and causes data communication to be started.

In contrast, in step S1114, the multiplexing controller 932 does not determine that the new member UE section 804 is a UE section serving as a target of data multiplexing, and instructs the data multiplexing section 306 not to multiplex data from the new member UE section 804 to data of the representative UE section. The multiplexing controller 932 sends a response signal Request reject indicating rejection of connection to the new member UE section 804 via the wireless sending section 314.

After steps S1112 and S1114, the process returns to step S1104, and the member terminal determining section 304 continues monitoring a connection request.

As has been described above, with regard to the wireless base station 802, when there are connection requests from a plurality of member UEs 204 and 804 belonging to the multiplexing terminal group, the communication quality of a group communication link established between the representative UE section and the core network may be evaluated, and whether the connection requests are to be permitted may be determined based on the evaluation result.

Therefore, with regard to the wireless base station 802, the number of communication links established with the core network may be reduced, while, for a plurality of wireless terminals (UEs) thereunder, the quality of communication with the core network may be maintained to be greater than or equal to the certain threshold.

3. Third Embodiment

Hereinafter, a wireless base station and a wireless communication system according to a third embodiment will be described.

Figure 12:
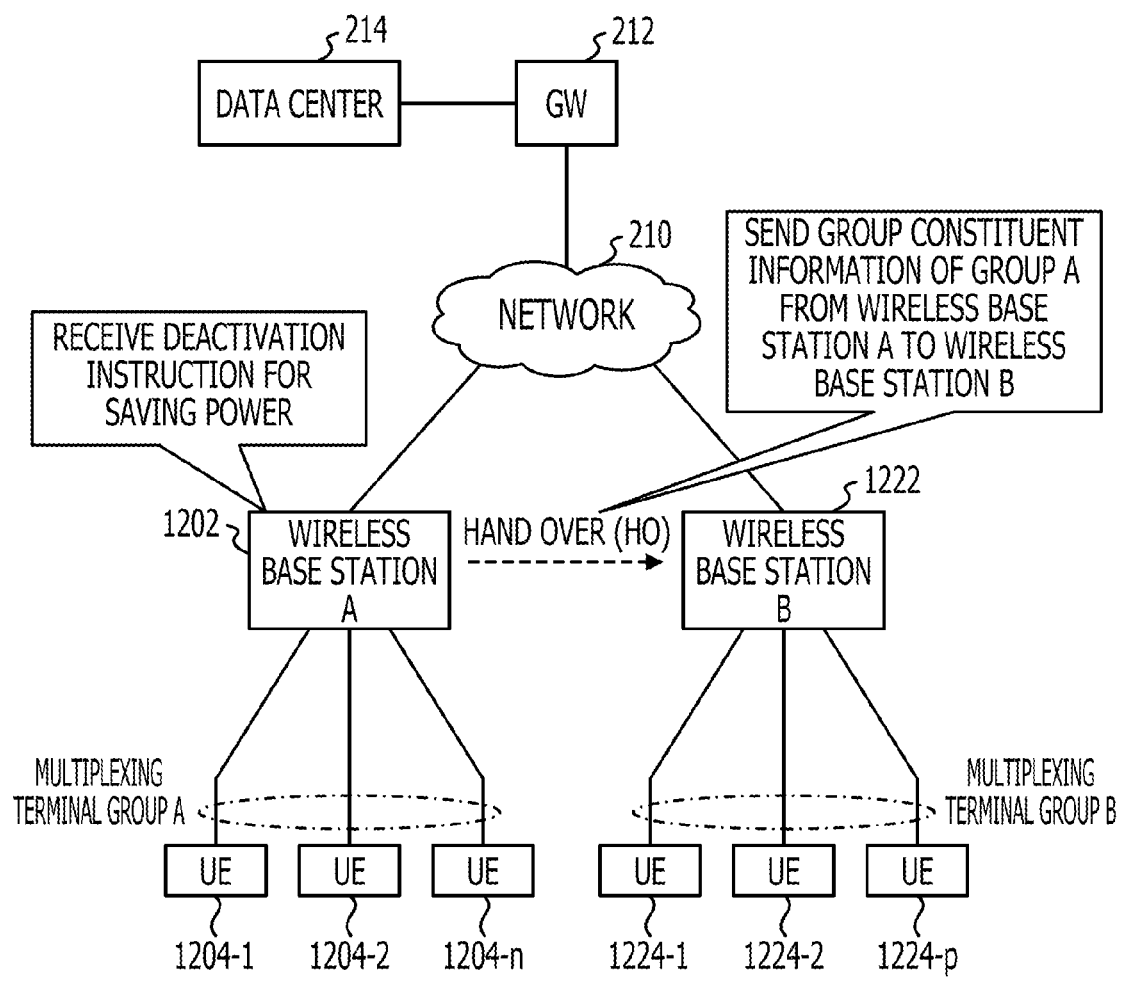
FIG. 12 is a diagram (part 1) illustrating an example of the configuration of a wireless communication system according to a third embodiment.
Figure 13:
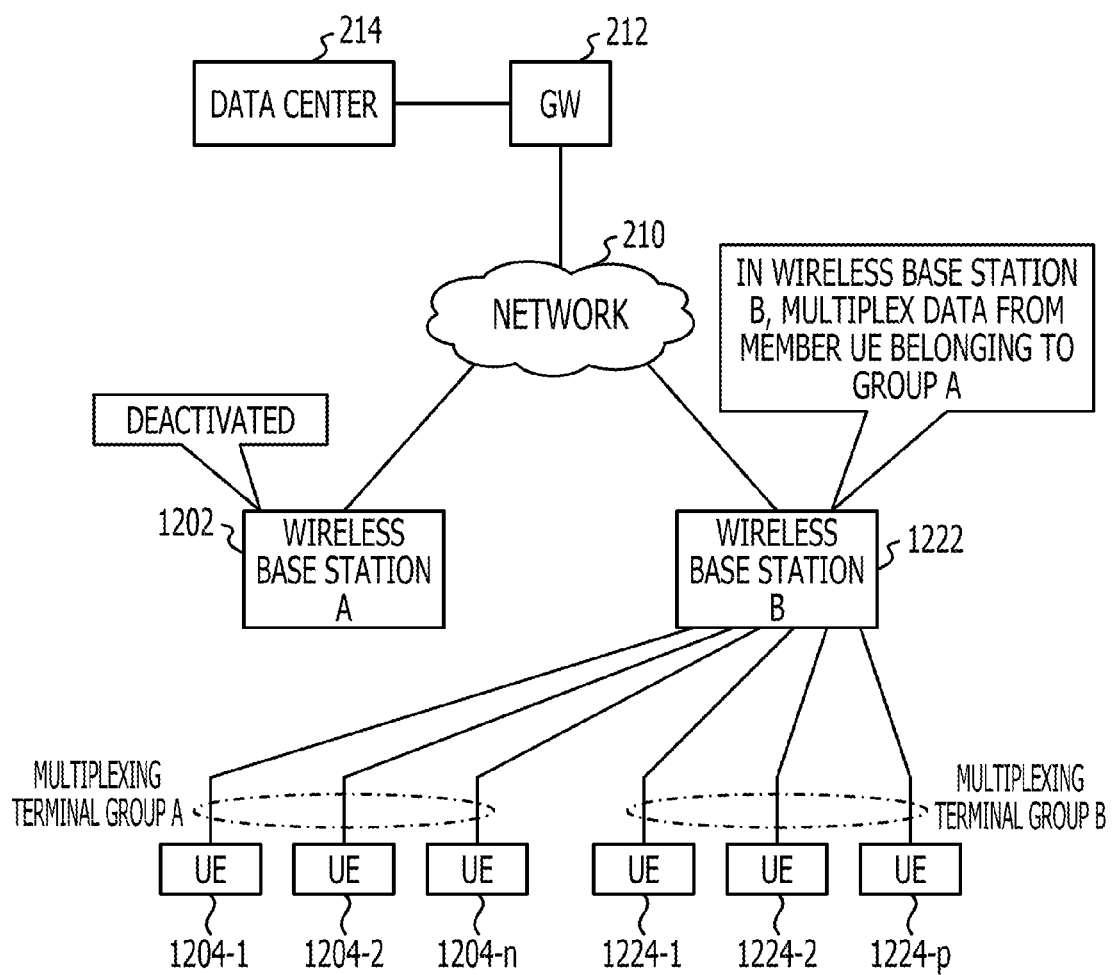
FIG. 13 is a diagram (part 2) illustrating an example of the configuration of the wireless communication system according to the third embodiment.

3-1. Wireless Communication System 3-1-1. Configuration of Wireless Communication System First, the overall configuration of a wireless communication system 1200 according to the third embodiment will be described. FIGS. 12 and 13 are diagrams illustrating examples of the configuration of the wireless communication system 1200 according to the third embodiment.

The wireless communication system 1200 illustrated in FIGS. 12 and 13 is the same as the wireless communication system 200 illustrated in FIG. 2 except for the point that a wireless base station B (1222) and wireless terminals (UEs) 1224-1 to 1224-$p$ are added. Portions in FIGS. 12 and 13 that are the same as or that correspond to those in the wireless communication system 200 illustrated in FIG. 2 are indicated with the same reference numerals. Because the operation and functions of portions that are indicated with the same reference numerals in FIGS. 12 and 13 are as those described using FIG. 2, detailed descriptions thereof are omitted.

Referring to FIGS. 12 and 13, UEs 1204-1 to 1204-$n$ are member UEs belonging to a multiplexing terminal group A positioned in the wireless area of a wireless base station A (1202). The UEs 1224-1 to 1224-$p$ are member UEs belonging to a multiplexing terminal group B positioned in the wireless area of the wireless base station B (1222) ($p$ is an integer corresponding to the number of corresponding member UEs).

As with the wireless base station 202 illustrated in FIG. 2, the wireless base station A (1202) establishes a group communication link A between the representative UE section of the multiplexing terminal group A (representative UE_A) and the core network via the network 210, and performs data communication via the established group communication link A.

As with the wireless base station 202, the wireless base station B (1222) establishes a group communication link B between the representative UE section of the multiplexing terminal group B (representative UE_B) and the core network via the network 210, and performs data communication via the established group communication link B.

Further, the wireless base stations A (1202) and B (1222) individually have, in addition to the functions of the wireless base station 202, the functions of sending group constituent information of the multiplexing terminal group thereunder to a wireless base station different from itself, and receiving group constituent information (member terminal IDs and group ID) of a multiplexing terminal group under a wireless base station different from itself from the wireless base station different from itself.

3-1-2. Operation of Wireless Communication System when Multiplexing Terminal Group is Moved from Wireless Base Station A to Wireless Base Station B Next, referring to FIGS. 12 and 13, as the operation of the wireless communication system when a multiplexing terminal group is moved from the wireless base station A (1202) to the wireless base station B (1222), the operation of the wireless communication system 1200 when, for example, the wireless base station A (1202) is stopped will be described.

In general, many wireless base stations are connected to a network, and the wireless areas of adjacent wireless base stations have an overlapping area. Therefore, even a single wireless terminal may often exist in an overlapping wireless area of a plurality of wireless base stations and may be connectable to these wireless base stations.

In contrast, the number of wireless terminals connected to a wireless base station is known to vary with time of day. For example, it is known that many wireless terminals are connected to a wireless base station at midday hours, whereas the number of wireless terminals connected per single wireless base station is fewer at midnight hours.

Therefore, it is conceivable that, during hours at which the number of wireless terminals connected to a wireless base station is relatively small, some of wireless base stations connected to a network may be stopped, thereby reducing the power consumption of the entire wireless communication system.

Referring to FIG. 12, the case is conceived in which one of the wireless base station A and the wireless base station B connected to the network 210, namely, the wireless base station A, is stopped, and, using FIGS. 12 and 13, the operation of the wireless communication system 1200 in that case will be described.

In FIGS. 12 and 13, it is assumed that the wireless base station A (1202) and the wireless base station B (1222) are adjacent to each other and have an overlapping wireless area, and the member UEs 1204-1 to 1204-$n$ belonging to the wireless terminal group A under the wireless base station A are positioned within that overlapping wireless area.

In FIG. 12, the member UEs 1204-1 to 1204-$n$ belonging to the wireless terminal group A are connected to the wireless base station A (1202) prior to deactivation of the wireless base station A. The wireless base station A (1202) multiplexes data from the member UEs 1204-1 to 1204-$n$ to data of the representative UE_A, and sends the multiplexed data to the data center 214 via the established group communication link A.

Similarly, the member UEs 1224-1 to 1224-$p$ belonging to the wireless terminal group B are connected to the wireless base station B (1222). The wireless base station B (1222) multiplexes data from the member UEs 1224-1 to 1224-$p$ to data of the representative UE_B, and sends the multiplexed data to the data center 214 via the established group communication link B.

In this state, for example, a controller (not illustrated) that controls a plurality of wireless base stations connected to the network 210 decides to stop one of the wireless base stations A and B, namely, the wireless base station A, to reduce the power consumption. The controller instructs, via the network 210, the wireless base station A to stop operating.

When the wireless base station A receives the deactivation instruction, the wireless base station A sends, prior to performing a deactivation process, a hand over request that requests the member UEs 1204-1 to 1204-$n$ thereunder to be handed over (hereinafter may also be referred to as "handover" (HO)) to the wireless base station B. That is, the received deactivation instruction triggers handing over of the member UEs 1204-1 to 1204-$n$ belonging to the multiplexing terminal group A under the wireless base station A. At this point, the wireless base station A simultaneously sends group constituent information A of the multiplexing terminal group A to which the member UEs 1204-1 to 1204-$n$ belong to the wireless base station B. The group constituent information A includes the member terminal IDs (member terminal ID_As) of the member UEs 1204-1 to 1204-$n$, and the group ID (group ID_A), which is the terminal ID of the representative UE_A.

In FIG. 13, when the wireless base station B receives the hand over request and the group constituent information A of the multiplexing terminal group A from the wireless base station A, the wireless base station B determines whether the hand over request is acceptable because the member UEs 1224-1 to 1224-$p$ belonging to the multiplexing terminal group B are already connected to the wireless base station B.

When the wireless base station B determines that the hand over request is acceptable, the wireless base station A instructs the member UEs 1204-1 to 1204-$n$ thereunder to be handed over to the wireless base station B, and thereafter, stops the internal operation. The wireless base station B holds, therein, the received group constituent information A and accepts handing over of the member UEs 1204-1 to 1204-$n$ belonging to the multiplexing terminal group A from the wireless base station A.

After the handing over is completed, the wireless base station B performs path switching of the group communication link A, which has been established between the representative UE_A and the core network in the wireless base station A, based on the group constituent information A held therein. A process of switching the path of a group communication link will be described later. The wireless base station B multiplexes data from the member UEs 1204-1 to 1204-$n$ to data of the representative UE_A, and starts sending the multiplexed data to the data center 214 via the group communication link A whose path has been switched.

As has been described above, in the wireless communication system 1200, when the hand over of the wireless terminals (UEs) 1204-1 to 1204-$n$ belonging to the multiplexing terminal group A under the wireless base station A is triggered, the group constituent information (member terminal IDs and group ID) of the multiplexing terminal group A, which is held by the wireless base station A at the hand over source, is sent to the wireless base station B at the hand over destination. Thus, the group communication link A, which has been established in the wireless base station A at the hand over source, may be passed over to the wireless base station B at the hand over destination. The wireless terminals (UEs) 1204-1 to 1204-$n$ may continue performing data communication via the group communication link A, which has been established between the representative UE_A and the core network, in the wireless base station B at the hand over destination.

Therefore, even when hand over to a different wireless base station occurs in the wireless communication system 1200, for a plurality of wireless terminals (UEs), the number of UEs whose data may be multiplexed may be increased, and the number of communication links to be established with the core network may be decreased.

3-2. Wireless Base Station

Figure 14:
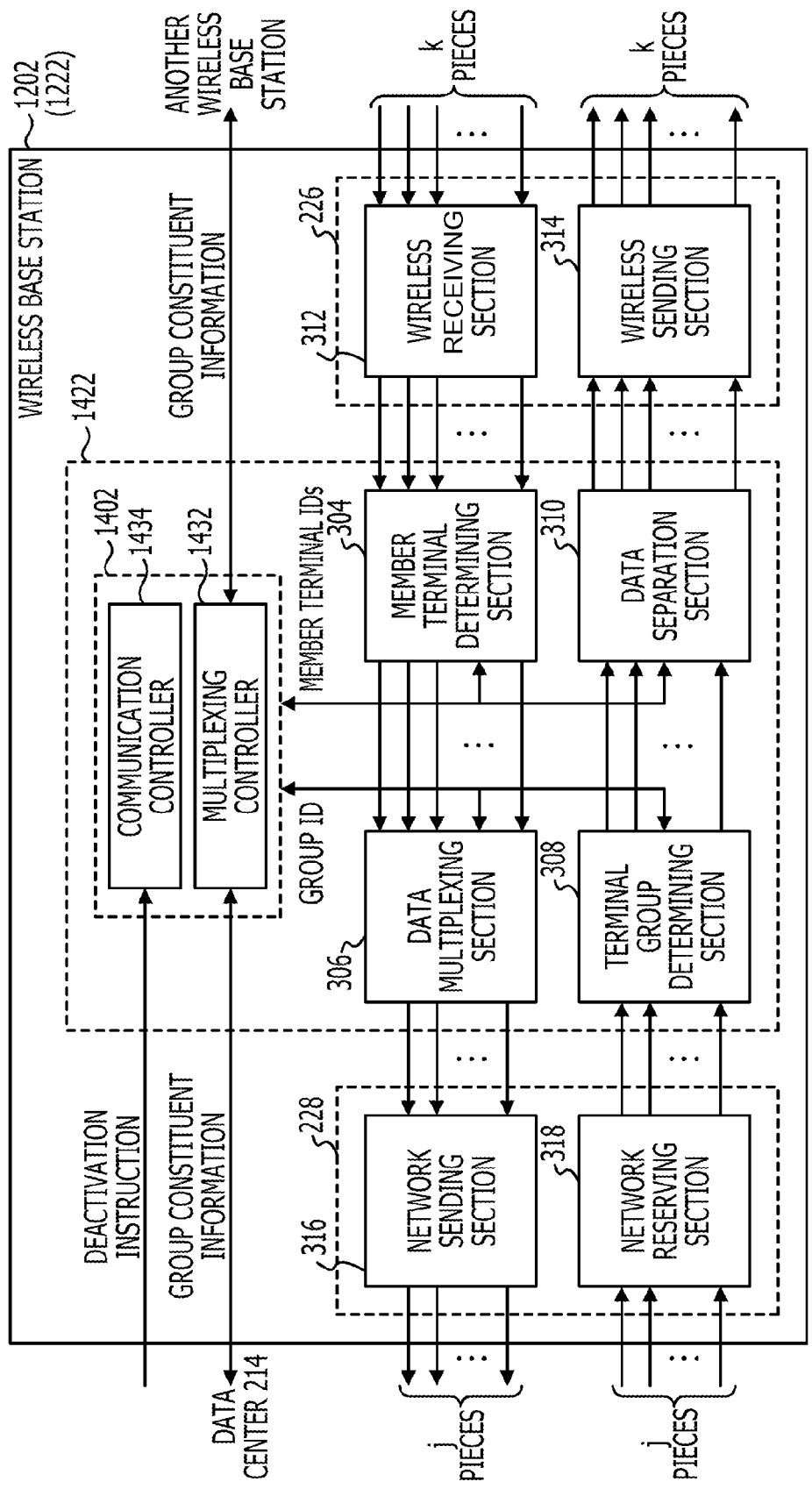
FIG. 14 is a diagram illustrating an example of the configuration of a wireless base station according to the third embodiment.

Next, the details of the configuration of the wireless base station 1202 (1222) according to the third embodiment will be described. FIG. 14 is a diagram illustrating an example of the configuration of the wireless base station 1202 (1222) according to the third embodiment. The wireless base station A (1202) and the wireless base station B (1222) in FIGS. 12 and 13 have the same configuration and have the configuration illustrated in FIG. 14.

As illustrated in FIG. 14, the configuration of the wireless base station 1202 (1222) is the same as the configuration of the wireless base station 202 illustrated in FIG. 3 except for the point that a controller 1402 is provided in a group communication controller 1422, and a multiplexing controller 1432 and a communication controller 1434 are provided in the controller 1402, instead of the point that the controller 302 is provided in the group communication controller 222, and the multiplexing controller 332 and the communication controller 334 are provided in the controller 302. Because the operation and functions of portions that are indicated with the same reference numerals in FIG. 14 are as those described using FIG. 3, detailed descriptions thereof are omitted.

In the group communication controller 1422, the multiplexing controller 1432 has the same functions as those of the multiplexing controller 332, holds the same group constituent information (member terminal IDs and group ID) as that held by the multiplexing controller 232 in the data center 214, and controls a process of multiplexing data sent from the member UEs 1204-1 to 1204-*n* (1224-1 to 1224-*p*). Also, the communication controller 1434 has the same functions as those of the communication controller 334 and establishes a group communication link between a representative UE section and the core network.

3-2-1. Configuration as Wireless Base Station at Hand Over Source

When the wireless base station 1202 (1222) operates as a wireless base station at the hand over source, the communication controller 1434 of the wireless base station 1202 (1222) has the following functions, in addition to the functions of the communication controller 334.

When the communication controller 1434 further detects triggering of the hand over of the member UEs 1204-1 to 1204-*n* (1224-1 to 1224-*p*) under the wireless base station 1202 (1222), the communication controller 1434 selects another wireless base station positioned nearby as the hand over destination. The communication controller 1434 sends the group constituent information (member terminal IDs and group ID) held in the multiplexing controller 1432 to the selected wireless base station via the network sending section 316, and requests the selected wireless base station to accept the hand over of the UEs thereunder. Hand over is triggered when, for example, a wireless base station receives a deactivation request from a controller (not illustrated) connected to the network 210.

The above-described selection of the wireless base station at the hand over destination is performed by, for example, referring to a table neighbor relation table (NRT) in which information of neighboring wireless base stations is registered, and randomly selecting one wireless base station from among the wireless base stations registered in the table NRT. Alternatively, when a wireless-base-station macro station that covers neighboring wireless areas is set, that macro station may preferentially be selected, instead of random selection.

When the communication controller 1434 further receives from the selected wireless base station a response, in response to the hand over request, which indicates acceptance of the hand over request via the network receiving section 318, the communication controller 1434 instructs the member UEs thereunder to be handed over to the selected wireless base station.

When triggering of the hand over is reception of a deactivation instruction, the communication controller 1434 further performs a process of deactivating the individual blocks in the wireless base station 1202 (1222) based on the received deactivation instruction. For example, in response to the deactivation instruction, the communication controller 1434 performs a power saving control process that has been set therein beforehand, thereby performing a process of deactivating the individual blocks included in the wireless communication section 226, the network communication section 228, and the group communication controller 1422 illustrated in FIG. 14 and deactivating the individual blocks.

A process of deactivating the individual blocks may be performed by stopping the supply of an operation clock signal to each block to be deactivated or stopping the power supply to each block to be deactivated.

As has been described above, with regard to the wireless base station 1202 (1222), when the hand over of the wireless terminals (UEs) belonging to the multiplexing terminal group thereunder is triggered, the group constituent information (member terminal IDs and group ID) of the multiplexing terminal group, which is held by the wireless base station 1202 (1222), is sent to a wireless base station at the hand over destination. Thus, a group communication link established in the wireless base station at the hand over source may be inherited, and data communication via the group communication link established between the representative UE section and the core network may be passed to the wireless base station at the hand over destination.

3-2-2. Configuration as Wireless Base Station at Hand Over Destination

In contrast, when the wireless base station 1202 (1222) operates as a wireless base station at the hand over destination, the multiplexing controller 1432 and the communication controller 1434 of the wireless base station 1202 (1222) have the following functions, in addition to the functions of the multiplexing controller 332 and the communication controller 334.

When the communication controller 1434 receives a hand over request from a wireless base station at the hand over source via the network receiving section 318, the communication controller 1434 further determines whether the wireless base station 1202 (1222) has communication resources that may accept the received hand over request. Member UEs belonging to another multiplexing terminal group may already be connected to the wireless base station 1202 (1222), and, when the hand over request is accepted, the communication resources of the wireless base station 1202 (1222) may be exhausted. On the basis of the determination result, the communication controller 1434 sends, via the network sending section 316, a response indicating whether to accept the hand over request to the wireless base station at the source of the hand over request.

The multiplexing controller 1432 further receives, from the wireless base station at the hand over source, the group constituent information (member terminal IDs and group ID) held by a multiplexing controller of the wireless base station at the hand over source via the network receiving section 318.

When it is determined as a result of the above-described determination that the hand over request is acceptable, the multiplexing controller 1432 holds the received group constituent information therein. The multiplexing controller 1432 supplies the member terminal IDs received from the wireless base station at the hand over source to the member terminal determining section 304 and the data separation section 310, and supplies the group ID received from the wireless base station at the hand over source to the data multiplexing section 306 and the terminal group determining section 308.

On the basis of the group ID included in the received group constituent information, the communication controller 1434 performs path switching of a group communication link that has been established between the representative UE section and the core network in the wireless base station at the hand over source.

As in the multiplexing controller 332, the multiplexing controller 1432 controls a multiplexing process of multiplexing data sent from the UEs 1204-1 to 1204-n (1224-1 to 1224-p) belonging to the multiplexing terminal group to data of the representative UE section. The network sending section 316 sends the multiplexed data to the data center 214 via the group communication link whose path has been switched.

The network receiving section 318 receives, from the data center 214, the multiplexed data via the group communication link whose path has been switched. As in the multiplexing controller 332, the multiplexing controller 1432 controls a separation process of separating the received multiplexed data to data of each member UE section.

As has been described above, when the wireless base station 1202 (1222) receives from another wireless base station a hand over request of wireless terminals (UEs) belonging to a multiplexing terminal group thereunder, the wireless base station 1202 (1222) receives group constituent information (member terminal IDs and group ID) of the multiplexing terminal group from the wireless base station at the hand over source. Therefore, a group communication link that has been established between a representative UE section and the core network in the wireless base station at the hand over source may be inherited, and data communication is enabled to continue via the group communication link.

3-3. Sequence of Multiplexing Process

Next, the sequence of a multiplexing process performed in the wireless communication system 1200 will be described.

Figure 15:
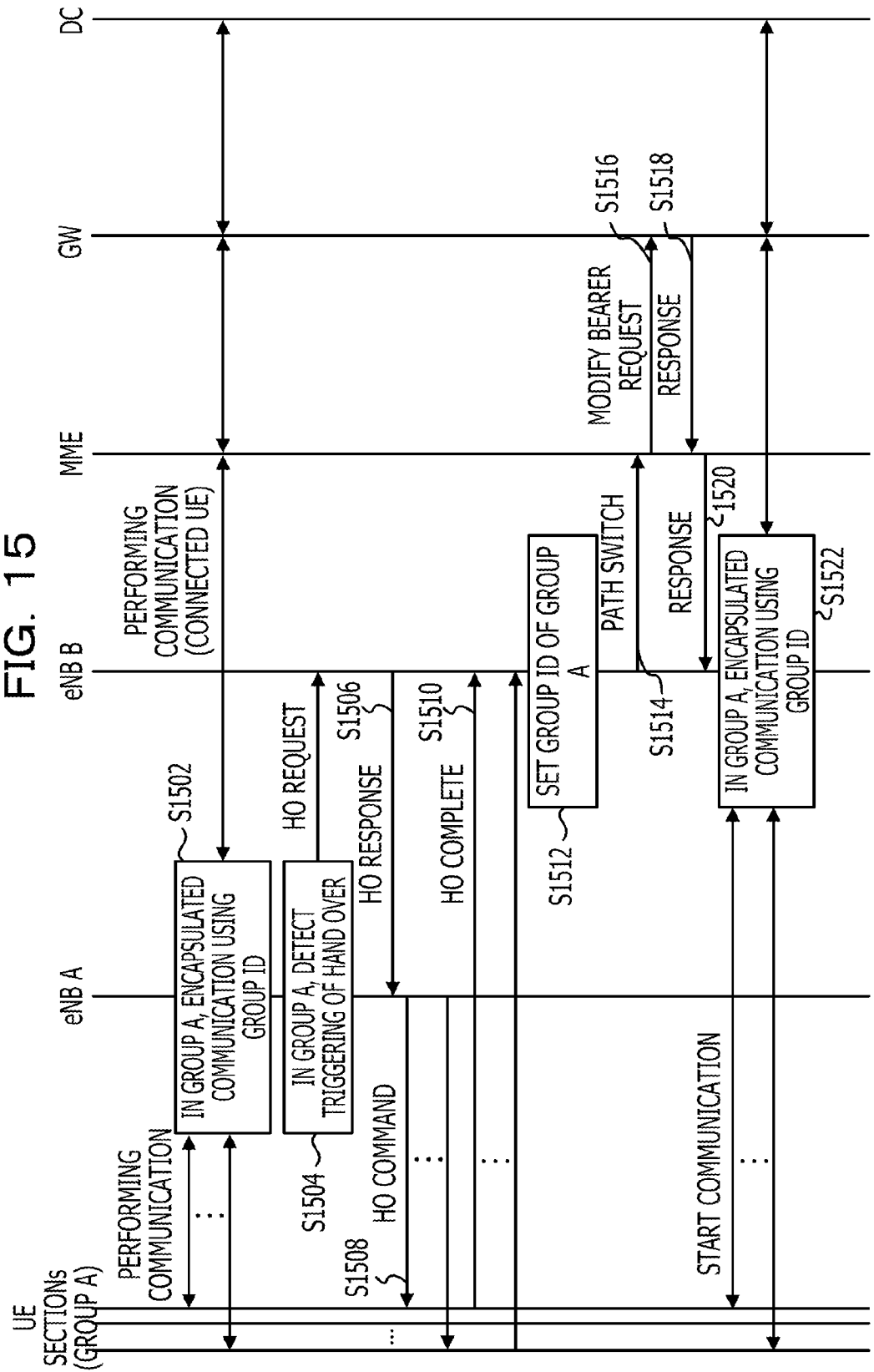
FIG. 15 is a diagram illustrating an example of the sequence of a multiplexing process when a wireless base station A is to be stopped, and member UEs of a multiplexing terminal group under the wireless base station A are to be handed over to a wireless base station B.

FIG. 15 is a diagram illustrating an example of the sequence of a multiplexing process when the member UEs of the multiplexing terminal group A thereunder are to be handed over to the wireless base station B.

First in step S1502, in the wireless base station A, the member UEs 1204-1 to 1204-n belonging to the multiplexing terminal group A are performing data communication with the data center 214 via the established group communication link A. At this point, the wireless base station A (1202) sends data that has been encapsulated using the group ID_A, which is the terminal ID of the representative UE_A, to the gateway 212. The wireless base station A also receives data that has been encapsulated using the group ID_A from the gateway 212.

Next in step S1504, the communication controller 1434 of the wireless base station A detects triggering of the hand over of the member UEs 1204-1 to 1204-n belonging to the multiplexing terminal group A thereunder. For example, the communication controller 1434 receives an instruction to deactivate the wireless base station A from a controller (not illustrated) connected to the network 210. In response to detection of triggering of the hand over, the communication controller 1434 sends a hand over request signal HO request that requests handing over of the member UEs 1204-1 to 1204-n thereunder to the wireless base station B via the network sending section 316. At this point, the hand over request signal HO request includes the group constituent information A (member terminal ID_As and group ID_A) of the multiplexing terminal group A to which the member UEs 1204-1 to 1204-n belong.

Next in step S1506, the multiplexing controller 1432 and the communication controller 1434 of the wireless base station B receive the hand over request signal and the group constituent information A of the wireless base station A from the wireless base station A via the network receiving section 318. In response to reception of the hand over request signal, the communication controller 1434 determines whether the wireless base station B has enough communication resources to accept the received hand over request. Since the member UEs 1224-1 to 1224-p belonging to the multiplexing terminal group B are already connected to the wireless base station B, when the hand over request that requests handing over of the member UEs of multiplexing terminal group A is accepted, the communication resources of the wireless base station B may be exhausted.

On the basis of the above-described determination result, the communication controller 1434 sends, via the network sending section 316, a response signal HO response in response to the received hand over request to the wireless base station A. The response signal HO response indicates whether the hand over request is accepted. In the example illustrated in FIGS. 12 and 15, it is assumed that the wireless base station B has enough communication resources to accept the hand over request. Thus, the wireless base station B sends a response signal indicating acceptance of the hand over request from the wireless base station A.

Next in step S1508, when the communication controller 1434 of the wireless base station A receives the response signal indicating acceptance of the hand over request from the wireless base station B via the network receiving section 318, the communication controller 1434 recognizes that the hand over may take place. The communication controller 1434 sends a hand over command signal HO command that instructs the member UEs 1204-1 to 1204-n belonging to the multiplexing terminal group A thereunder to be handed over to the wireless base station B.

Next in step S1510, when the member UEs 1204-1 to 1204-n belonging to the multiplexing terminal group A receive, from the wireless base station A, the hand over command signal which instructs hand over to the wireless base station B, the member UEs 1204-1 to 1204-n perform a process of hand over from the wireless base station A to the wireless base station B based on the received hand over command signal. When the hand over process is completed, the member UEs 1204-1 to 1204-n send, to the wireless base station B, a hand over completion notification signal HO complete that indicates completion of the process of hand over from the wireless base station A to the wireless base station B.

Next in step S1512, the communication controller 1434 of the wireless base station B receives the hand over completion notification signal which indicates completion of the hand over process from the member UEs 1204-1 to 1204-n belonging to the multiplexing terminal group A. On the basis of the received hand over completion signal, the communication controller 1434 recognizes that the hand over process is completed and the member UEs 1204-1 to 1204-n belonging to the multiplexing terminal group A are connected to the wireless base station B.

When the communication controller 1434 recognizes the completion of the hand over process, the multiplexing controller 1432 sets, therein, the group ID_A and the member terminal ID_As, which are included in the group constituent information A of the multiplexing terminal group A, which has been received in step S1504. On the basis of the setting of the group ID_A made by the multiplexing controller 1432, the communication controller 1434 sets, therein, the representative UE section (representative UE_A) of the multiplexing terminal group A, which has the group ID_A as the terminal ID. The communication controller 1434 starts a process of switching the path of the group communication link A between the set representative UE_A and the core network.

Next in step S1514, the communication controller 1434 of the wireless base station B sends a path switching signal Path switch that requests switching of the path of the group communication link A between the representative UE_A and the core network to the MME via the network sending section 316. The path switching signal is a signal that indicates switching of the relay node of the group communication link A from the wireless base station A to the wireless base station B.

Next in step S1516, when the MME receives the path switching signal from the wireless base station B, based on the received path switching signal, the MME sends, to the gateway 212, a modification request signal Modify Bearer request that requests modification of the communication path toward the representative UE_A.

Next in step S1518, when the gateway 212 receives the modification request signal from the MME, based on the received modification request signal, the gateway 212 determines whether to permit modification of the communication path toward the representative UE_A, and sends, to the MME, a response signal Response in response to the received modification request signal. In the example illustrated in FIG. 15, it is assumed that the gateway 212 permits modification of the communication path. Thus, the gateway 212 performs a process of modifying the communication path toward the representative UE_A, and sends a response signal indicating permission of the modification of the communication path to the MME.

Next in step S1520, when the MME receives the response signal from the gateway 212, based on the received response signal, the MME sends, to the wireless base station B, a response signal Response in response to the received path switching signal. The response signal indicates whether the relay node of the path of the group communication link A toward the representative UE_A has been switched from the wireless base station A to the wireless base station B. Since the gateway 212 has permitted modification of the communication path in the example illustrated in FIG. 15, the MME sends, to the wireless base station B, a response signal indicating that a process of switching the path of the group communication link A between the representative UE_A and the core network has been completed.

Next in step S1522, the communication controller 1434 of the wireless base station B receives, from the MME via the network receiving section 318, the response signal indicating that a process of switching the path of the group communication link A has been completed. Accordingly, the communication controller 1434 recognizes that a process of switching the relay node of the path of the group communication link A between the representative UE_A and the core network from the wireless base station A to the wireless base station B has been completed. Thereafter, in the wireless base station B, the member UEs 1204-1 to **1204-*n* belonging to the multiplexing terminal group A resume data communication with the data center 214 via the group communication link A whose path has been switched. At this point, the wireless base station B sends data that has been encapsulated using the group ID_A, which is the terminal ID of the representative UE_A, to the gateway 212. Also, the wireless base station B receives data that has been encapsulated using the group ID_A from the gateway 212**.

As has been described above, in the wireless communication system 1200, when the wireless base station A detects triggering of the hand over of the wireless terminals (UEs) belonging to the multiplexing terminal group A thereunder, the wireless base station A sends the group constituent information (member terminal IDs and group ID) of the multiplexing terminal group A held by the wireless base station A at the hand over source to the wireless base station at the hand over destination. Accordingly, the wireless base station B at the hand over destination may inherit, from the wireless base station A at the hand over source, the group communication link A established between the representative UE_A and the core network, and enable the wireless terminals (UEs) 1204-1 to **1204-*n*** to continue data communication via the group communication link A.

Therefore, in the wireless communication system 1200, even when hand over occurs between different wireless base stations, for a plurality of wireless terminals (UEs), the number of UEs whose data may be multiplexed may be increased, and the number of communication links to be established with the core network may be decreased.

3-4. Flow of Multiplexing Process Performed by Wireless Base Stations A and B

Next, the flow of a multiplexing process performed by the group communication controllers of the wireless base stations A and B will be described. Here, the following description discusses the flow of a multiplexing process performed by the wireless base station A at the hand over source and the wireless base station B at the hand over destination when the member UEs of the multiplexing terminal group A under the wireless base station A are to be handed over to the wireless base station B in FIG. 12.

3-4-1. Flow of Multiplexing Process Performed by Wireless Base Station A

Figure 16:
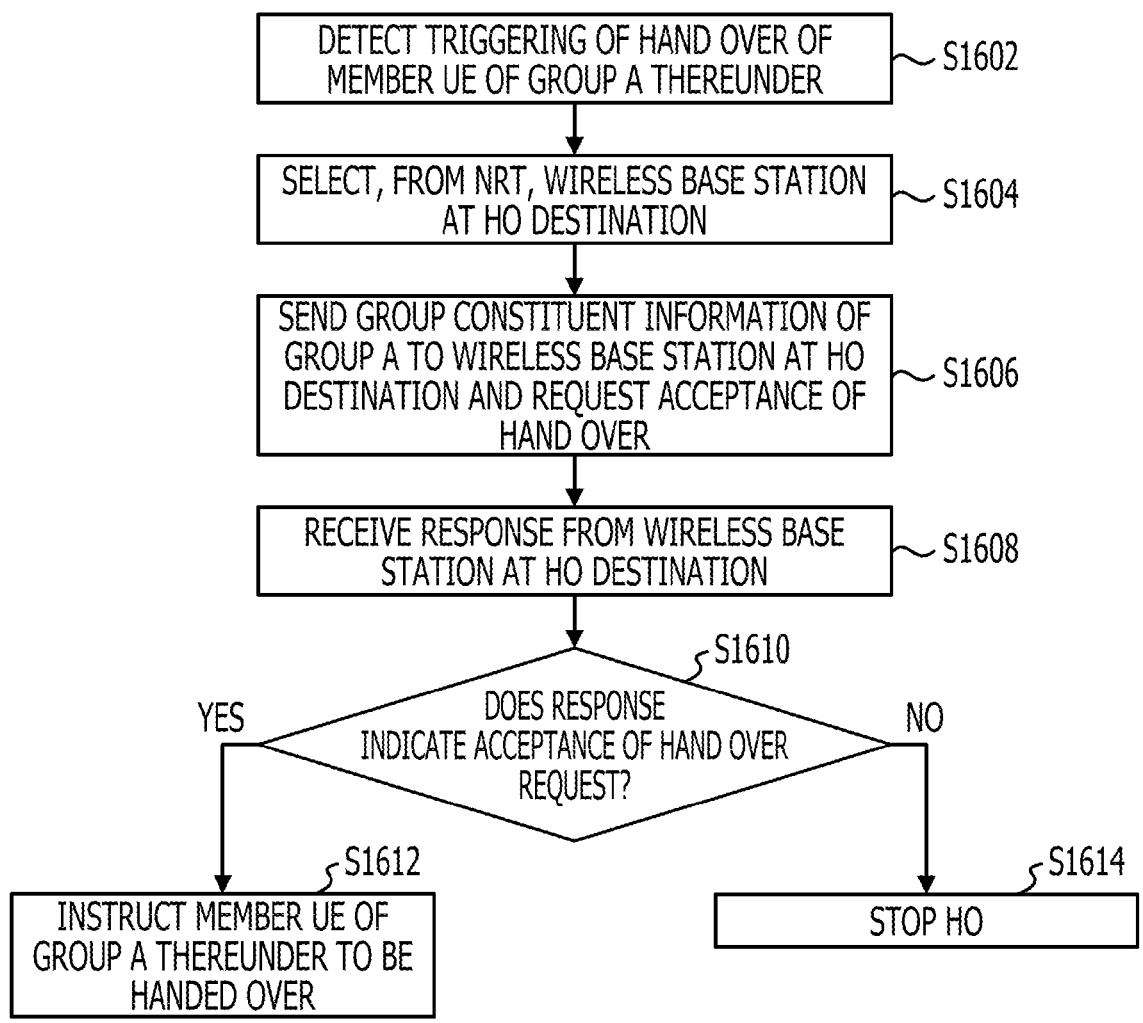
FIG. 16 is a flowchart of a multiplexing process performed by a group communication controller of the wireless base station A serving as a hand over source.

FIG. 16 is a flowchart of a multiplexing process performed by the group communication controller of the wireless base station A at the hand over source.

First in step S1602, the communication controller 1434 of the wireless base station A detects triggering of the hand over of the member UEs 1204-1 to **1204-*n* belonging to the multiplexing terminal group A under the wireless base station A. Triggering of the hand over is, for example, reception of an instruction from a controller (not illustrated) connected to the network 210** to deactivate the wireless base station A.

Next, the communication controller 1434 prepares beforehand a table neighbor relation table (NRT) in which information of neighboring wireless base stations is registered and holds therein the table NRT. In step S1604, the communication controller 1434 selects the wireless base station at the hand over destination by, for example, randomly selecting one of the wireless base stations registered in the table NRT. In the example illustrated in FIG. 16, it is assumed that the wireless base station B is selected as the wireless base station at the hand over destination.

Next in step S1606, the communication controller 1434 sends the group constituent information A (member terminal ID_As and group ID_A) of the multiplexing terminal group A, which is held in the multiplexing controller 1432, to the wireless base station B, which is selected as the hand over destination, via the network sending section 316. At the same time, the communication controller 1434 requests the selected wireless base station B to accept the hand over of the member UEs 1204-1 to 1204-n belonging to the multiplexing terminal group A under the wireless base station A.

Next in step S1608, the communication controller 1434 receives, from the wireless base station B, which is selected as the hand over destination, a response in response to the hand over request issued in step S1606 via the network receiving section 318.

Next in step S1610, the communication controller 1434 determines whether the response received in step S1608 indicates acceptance of the hand over request. When the response indicates acceptance of the hand over request, the process proceeds to step S1612. When the response indicates rejection of the hand over request, the process proceeds to step S1614.

Next in step S1612, the communication controller 1434 instructs the member UEs 1204-1 to 1204-n belonging to the multiplexing terminal group A under the wireless base station A to be handed over to the selected wireless base station B. By performing the hand over to the wireless base station B, the member UEs 1204-1 to 1204-n belonging to the multiplexing terminal group A are enabled to continue data communication via the group communication link A in the wireless base station B.

When triggering of the hand over is reception of a deactivation instruction, the communication controller 1434 deactivates the individual blocks in the wireless base station A based on the received deactivation instruction.

In contrast, in step S1614, the communication controller 1434 stops the hand over process for the member UEs 1204-1 to 1204-n belonging to the multiplexing terminal group A under the wireless base station A.

As has been described above, when the wireless base station A at the hand over source detects triggering of the hand over of the wireless terminals (UEs) belonging to the multiplexing terminal group A thereunder, the wireless base station A sends the group constituent information (member terminal ID_As and group ID_A) of the multiplexing terminal group A held by the wireless base station A at the hand over source to the wireless base station B at the hand over destination, and, at the same time, requests the wireless base station B at the hand over destination to accept the hand over. Accordingly, the wireless base station B at the hand over destination may inherit the group communication link A established between the representative UE_A and the core network, and may inherit data communication via the group communication link A.

3-4-2. Flow of Multiplexing Process Performed by Wireless Base Station B

Figure 17:
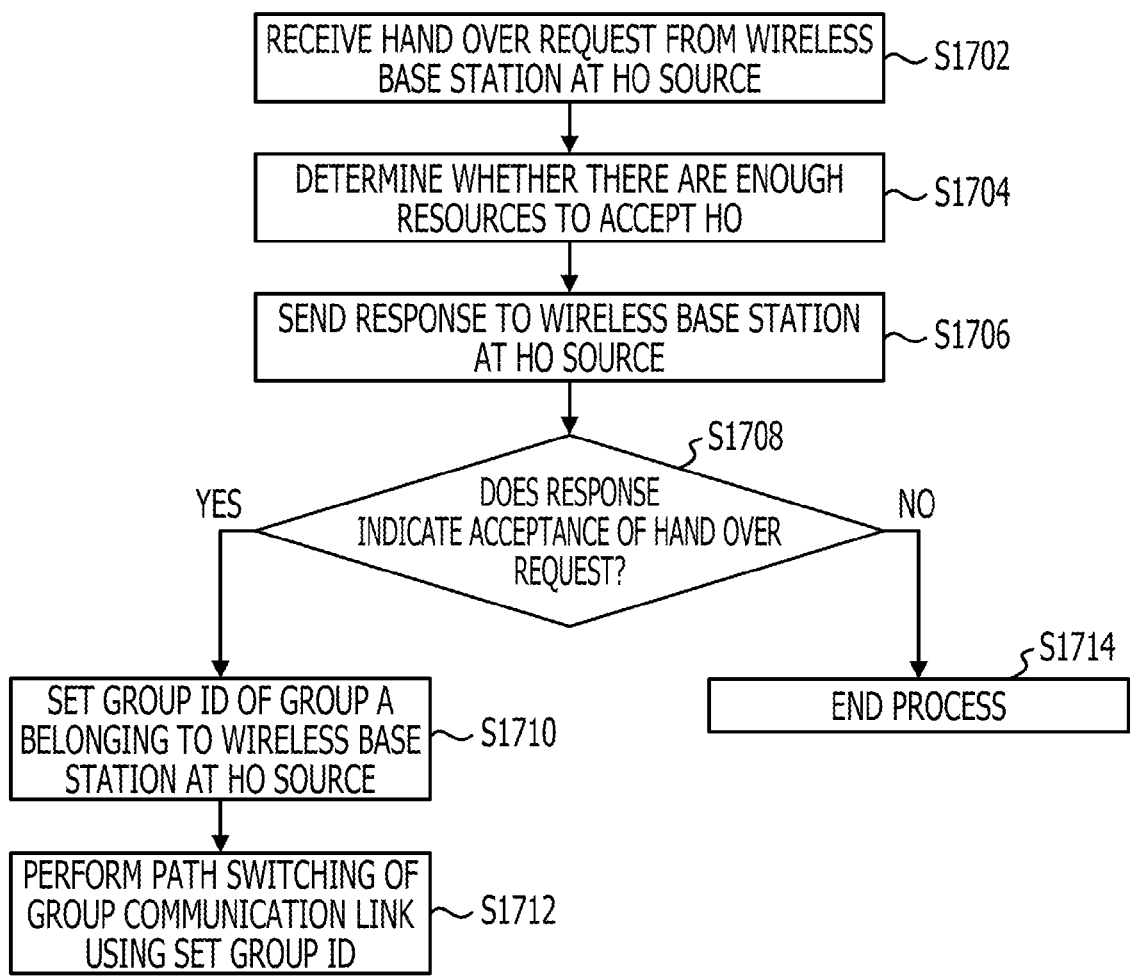
FIG. 17 is a flowchart of a multiplexing process performed by a group communication controller of the wireless base station B serving as a hand over destination.

FIG. 17 is a flowchart of a multiplexing process performed by the group communication controller of the wireless base station B at the hand over destination.

First in step S1702, the communication controller 1434 of the wireless base station B receives a hand over request from the wireless base station A at the hand over source via the network receiving section 318. The hand over request requests the member UEs 1204-1 to 1204-n belonging to the multiplexing terminal group A under the wireless base station A to be handed over to the wireless base station B.

At the same time, the multiplexing controller 1432 receives the group constituent information A (member terminal ID_As and group ID_A) of the multiplexing terminal group A, which is held in the multiplexing controller of the wireless base station A, from the wireless base station A at the hand over source via the network receiving section 318.

Next in step S1704, the communication controller 1434 determines whether the wireless base station B at the hand over destination has enough communication resources to accept the received hand over request. Since the member UEs 1224-1 to 1224-p belonging to another multiplexing terminal group B are already connected to the wireless base station B, when the hand over request is accepted, the communication resources of the wireless base station B may be exhausted.

Next in step S1706, the communication controller 1434 sends, based on the determination result in step S1704, a response indicating whether to accept the hand over request received in step S1702 to the wireless base station A at the hand over source via the network sending section 316.

Next in step S1708, the communication controller 1434 determines whether the response sent in step S1706 indicates acceptance of the hand over request. When the response indicates acceptance of the hand over request, the process proceeds to step S1710. When the response indicates rejection of the hand over request, the process proceeds to step S1714.

Next in step S1710, the multiplexing controller 1432 sets, therein, the group constituent information A received in step S1702, and sets, therein, the group ID_A included in the group constituent information A. The group ID_A is the terminal ID of the representative UE_A, which is allocated to the multiplexing terminal group A. Accordingly, the communication controller 1434 sets, therein, the representative UE section (representative UE_A) of the multiplexing terminal group A, which has the group ID_A as the terminal ID.

Next in step S1712, the communication controller 1434 performs path switching of the group communication link A established between the representative UE_A and the core network in the wireless base station A at the hand over source, based on the group ID_A set in step S1710. Accordingly, the communication controller 1434 switches the relay node of the path of the group communication link A between the representative UE_A and the core network from the wireless base station A at the hand over source to the wireless base station B at the hand over destination.

The multiplexing controller 1432 supplies the group ID_A, which is the terminal ID of the representative UE_A, to the data multiplexing section 306 and the terminal group determining section 308, and supplies the member terminal ID_As, which are the terminal IDs of the member UEs belonging to the multiplexing terminal group A, to the member terminal determining section 304 and the data separation section 310. Accordingly, the multiplexing controller 1432 causes data communication with the data center 214 to be resumed via the group communication link A whose path has been switched.

In contrast, in step S1714, the communication controller 1434 ends the process concerning the hand over request. Also, the multiplexing controller 1432 discards the group constituent information A received in step S1702.

As has been described above, when the wireless base station at the hand over destination permits the hand over request from another wireless base station, the wireless base station at the hand over destination receives the group constituent information (member terminal IDs and group ID) of the multiplexing terminal group from the wireless base station at the hand over source. Accordingly, the wireless base station at the hand over destination may inherit a group communication link established between the representative UE section and the core network in the wireless base station at the hand over source, and enable data communication to continue via the group communication link.

Note that the wireless base station and the wireless communication system according to the third embodiment may have the functions of the wireless base station and the wireless communication system according to the second embodiment. For example, in the wireless base station 1222, the multiplexing controller 1432 of the group communication controller 1422 may have the function of evaluating the communication quality QoS of a group communication link, as in the multiplexing controller 932 of the group communication controller 822.

According to the wireless base stations and the wireless communication systems according to the first to third embodiments, for a plurality of wireless terminals (UEs) thereunder, the number of UEs whose data may be multiplexed may be increased, and the number of communication links to be established with the core network may be decreased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless base station comprising:
   a receiver configured to wirelessly receive data from a plurality of terminals positioned within a wireless area; and
   a controller coupled to the receiver and configured to:
      obtain first identification information and second identification information, the first identification information being allocated to a group corresponding to data processing performed by a processing device to collect data received from a plurality of member terminals constituting the group and to apply the data processing for the collected data, the processing device communicating with the wireless base station via a core network, and the second identification information being allocated to each of the plurality of member terminals constituting the group,
      determine whether a terminal serving as a source of the received data is a member terminal belonging to the group, based on the second identification information,
      multiplex, of the received data from the plurality of terminals, data from one or more terminals determined to be one or more member terminals belonging to the group, using the first identification information for sending the multiplexed data from the wireless base station to the processing device via the core network for the data processing, and
      send the multiplexed data to the core network.

2. The wireless base station according to claim 1,
   wherein, when performing the multiplexing, the controller generates encapsulated data using the first identification information by adding the first identification information to the data from the one or more terminals determined to be the one or more member terminals belonging to the group, and
   wherein the controller sends the encapsulated data as the multiplexed data to the core network.

3. The wireless base station according to claim 1, wherein the controller is configured to:
   control establishment of a communication link between the plurality of terminals and the core network,
   establish, when no communication link is established between any of the plurality of member terminals belonging to the group and the core network, a group communication link with the core network based on the first identification information, the group communication link being shared among the plurality of member terminals belonging to the group, and
   send the multiplexed data to the core network via the established group communication link.

4. The wireless base station according to claim 3,
   wherein the controller allocates, when a communication link has been established between at least one member terminal belonging to the group and the core network, the group communication link established with the core network based on the first identification information to the one or more terminals determined to be the one or more member terminals belonging to the group, and
   wherein the controller sends the multiplexed data to the core network via the allocated group communication link.

5. The wireless base station according to claim 3,
   wherein the first identification information and the second identification information used when the controller establishes the group communication link are different from the first identification information and the second identification information used when the controller sends the multiplexed data, respectively.

6. The wireless base station according to claim 3,
   wherein the controller is configured to:
      evaluate a communication quality of the group communication link, and
      control the data multiplexing to not multiplex the data from the one or more terminals determined to be the one or more member terminals belonging to the group when the evaluated communication quality falls below a certain threshold.

7. The wireless base station according to claim 6,
   wherein the communication quality is a number of the one or more terminals determined to be the one or more member terminals from which data is to be multiplexed and to which data is sent via the group communication link, and
   wherein the multiplexing controller determines that the communication quality falls below the certain threshold when the number of the one or more terminals exceeds a certain upper limit.

8. The wireless base station according to claim 1,
   wherein the controller sends, when the group is to be handed over to another wireless base station, group constituent information including the first identification information and the second identification information to the wireless base station at a hand over destination.

9. The wireless base station according to claim 1,
   wherein the controller is configured to
      receive, when a request for handing over the group is received from another wireless base station, group constituent information including the first identification information and the second identification information from the other wireless base station,
      use the second identification information included in the group constituent information received from the other wireless base station to determine whether the terminal is the member terminal based on the second identification information included in the group constituent information received from the other wireless base station, and use the first identification information included in the group constituent information received from the other wireless base station to multiplex the data from the one or more terminals determined to be the one or more member terminals.

10. The wireless base station according to claim 1, wherein the controller is configured to:

control establishment of a communication link between the plurality of terminals and the core network, receive a request for handing over the group from another wireless base station, and, when a group communication link with the core network has been established in the other wireless base station, the group communication link being shared among the plurality of member terminals, perform path switching of the established group communication link.

11. The wireless base station according to claim 1, wherein the controller is configured to:

receive multiplexed data from the core network;

determine, based on the first identification information, whether a terminal at an address of the received, multiplexed data is a member terminal belonging to the group, separate, when the controller determines that the terminal at the address of the received data is the member terminal belonging to the group, the received, multiplexed data for each member terminal at the address based on the second identification information; and a transmitter configured to wirelessly transmit the separated data to the member terminal at the address.

12. The wireless base station according to claim 11, wherein, when performing the separation, the controller generates decapsulated data by deleting the first identification information from the multiplexed data, and wherein the transmitter transmits the decapsulated data as the separated data to the member terminal at the address.

13. A wireless communication system comprising:

a gateway configured to control connection with a processing section on a network;

a first wireless base station configured to perform data communication between a plurality of terminals positioned within a first wireless area and the gateway; and a second wireless base station configured to include the plurality of terminals in a second wireless area, wherein the first wireless base station is configured to:

wirelessly receive data from the plurality of terminals, obtain first identification information and second identification information, the first identification information being allocated to a group corresponding to data processing performed by the processing section to collect data received from a plurality of member terminals constituting the group and to apply the data processing for the collected data, and the second identification information allocated to each of the plurality of member terminals constituting the group, determine whether a terminal serving as a source of the received data is a member terminal belonging to the group, based on the second identification information, multiplex, of the received data from the plurality of terminals, data from or more terminals determined to be one or more member terminals belonging to the group, using the first identification information for sending the multiplexed data from the first wireless base station to the processing section via a core network for the data processing, and send the multiplexed data to the gateway.

14. The wireless communication system according to claim 13, wherein the first wireless base station sends, when the group is to be handed over from the first wireless base station to the second wireless base station, group constituent information including the first identification information and the second identification information to the second wireless base station.

15. The wireless communication system according to claim 14, wherein the second wireless base station receives, when the group is to be handed over from the first wireless base station to the second wireless base station, the first identification information and the second identification information included in the group constituent information from the first wireless base station, and wherein the second wireless base station is configured to:

receive data from the plurality of terminals, hold the received first identification information and the received second identification information, determine whether a terminal serving as a source of the received data by the second wireless base station is a member terminal belonging to the group, based on the received second identification information, multiplex, of the received data by the second wireless base station from the plurality of terminals, data from the terminal determined to be the member terminal belonging to the group, using the received first identification information for sending the multiplexed data from the second wireless base station to the processing section via the core network for the data processing, and send the multiplexed data to the gateway.

16. A wireless communication method, comprising:

receiving data, wirelessly by a wireless base station, from a plurality of terminals positioned within a wireless area;

obtaining, at the wireless base station, first identification information and second identification information, the first identification information being allocated to a group corresponding to data processing performed by a processing device to collect data received from a plurality of member terminals constituting the group and to apply the data processing for the collected data the processing device communicating with the wireless base station via a core network, and the second identification information being allocated to each of the plurality of member terminals constituting the group;

determining, based on the second identification information, whether a terminal serving as a source of the received data is a member terminal belonging to the group;

multiplexing, of the received data from the plurality of terminals, data from one or more terminals determined to be one or more member terminals belonging to the group, using the first identification information for sending the multiplexed data from the wireless base station to the processing device via the core network for the data processing; and sending the multiplexed data to the core network.

* * * * *